United States Patent
Nagoshi et al.

(10) Patent No.: US 8,408,177 B2
(45) Date of Patent: Apr. 2, 2013

(54) CONTROL METHOD FOR INTERNAL COMBUSTION ENGINE SYSTEM, AND INTERNAL COMBUSTION ENGINE SYSTEM

(75) Inventors: Masahiro Nagoshi, Hiroshima (JP); Masayuki Tetsuno, Hiroshima (JP); Katsuma Yoshida, Higashihiroshima (JP)

(73) Assignee: Mazda Motor Corporation (JP)

( * ) Notice: Subject to any disclaimer, the term of this patent is extended or adjusted under 35 U.S.C. 154(b) by 1038 days.

(21) Appl. No.: 12/396,068

(22) Filed: Mar. 2, 2009

(65) Prior Publication Data

US 2009/0241883 A1    Oct. 1, 2009

(30) Foreign Application Priority Data

Mar. 28, 2008  (JP) ................... 2008-088049
Mar. 28, 2008  (JP) ................... 2008-088050

(51) Int. Cl.
 *F02N 11/08* (2006.01)
(52) U.S. Cl. .................... 123/179.4
(58) Field of Classification Search ........... 123/179.4, 123/198 DB, 198 F, 198 DC; 180/65.1, 65.21, 180/65.31; 701/22, 36, 112
See application file for complete search history.

(56) References Cited

U.S. PATENT DOCUMENTS

| | | | |
|---|---|---|---|
| 7,128,043 B2 * | 10/2006 | Lewis et al. | 123/198 F |
| 7,336,002 B2 * | 2/2008 | Kato et al. | 307/10.6 |
| 7,501,791 B2 * | 3/2009 | Thimm et al. | 320/104 |
| 2002/0017261 A1 * | 2/2002 | Kuroda et al. | 123/179.4 |
| 2005/0278080 A1 * | 12/2005 | Pilgrim et al. | 701/1 |
| 2007/0170778 A1 * | 7/2007 | Yamaguchi | 307/10.1 |

FOREIGN PATENT DOCUMENTS

| | | |
|---|---|---|
| DE | 10211466 C1 | 3/2003 |
| DE | 102005003979 B3 | 3/2006 |
| EP | 1564403 A2 | 8/2005 |
| EP | 1810887 A2 | 1/2007 |
| JP | S58-162747 A | 9/1983 |
| JP | 2001-173480 A | 6/2001 |
| JP | 2001173480 | 6/2001 |
| JP | 2002118978 | 4/2002 |
| JP | 2005-287146 A | 10/2005 |
| JP | 2006-336628 A | 12/2006 |
| WO | 2009024706 A2 | 2/2009 |

OTHER PUBLICATIONS

European Search Report date Jun. 19, 2009; Application No. / Patent No. 09003117.0-1263.

(Continued)

*Primary Examiner* — Stephen K Cronin
*Assistant Examiner* — Sizo Vilakazi
(74) *Attorney, Agent, or Firm* — Studebaker & Brackett PC; Donald R. Studebaker

(57) ABSTRACT

The invention relates to a control method for an internal combustion engine system, capable of preventing an internal combustion engine in a state after being automatically stopped, from falling into an unrestartable state. Upon satisfaction of a given automatic stop condition, the engine 10 being running is automatically stopped (Step 11). A value of current $I_{EBAT}$ flowing out of a starter battery 520 is compared with a given current value $I_{EBAT\_TH}$, in an automatically stopped state of the engine 10 (Step S30) to diagnosis a discharging status of the starter battery 520. If a result of the diagnosis indicates that the value of current $I_{EBAT}$ flowing out of the starter battery 520 is greater than the given current value $I_{EBAT\_TH}$, it is determined that a post-attached load is detected, and the engine 10 is restarted irrespective of the satisfaction or non-satisfaction of a given restart condition.

20 Claims, 10 Drawing Sheets

OTHER PUBLICATIONS

Japanese Office Action "Notice of Reasons for Rejection" with mailing date of Mar. 15, 2011; Japanese Patent Application No. 2008-088049 with translation.

Japanese Office Action "Notice of Reasons for Rejection" with mailing date of Mar. 15, 2011; Japanese Patent Application No. 2008-088050 with translation.

* cited by examiner

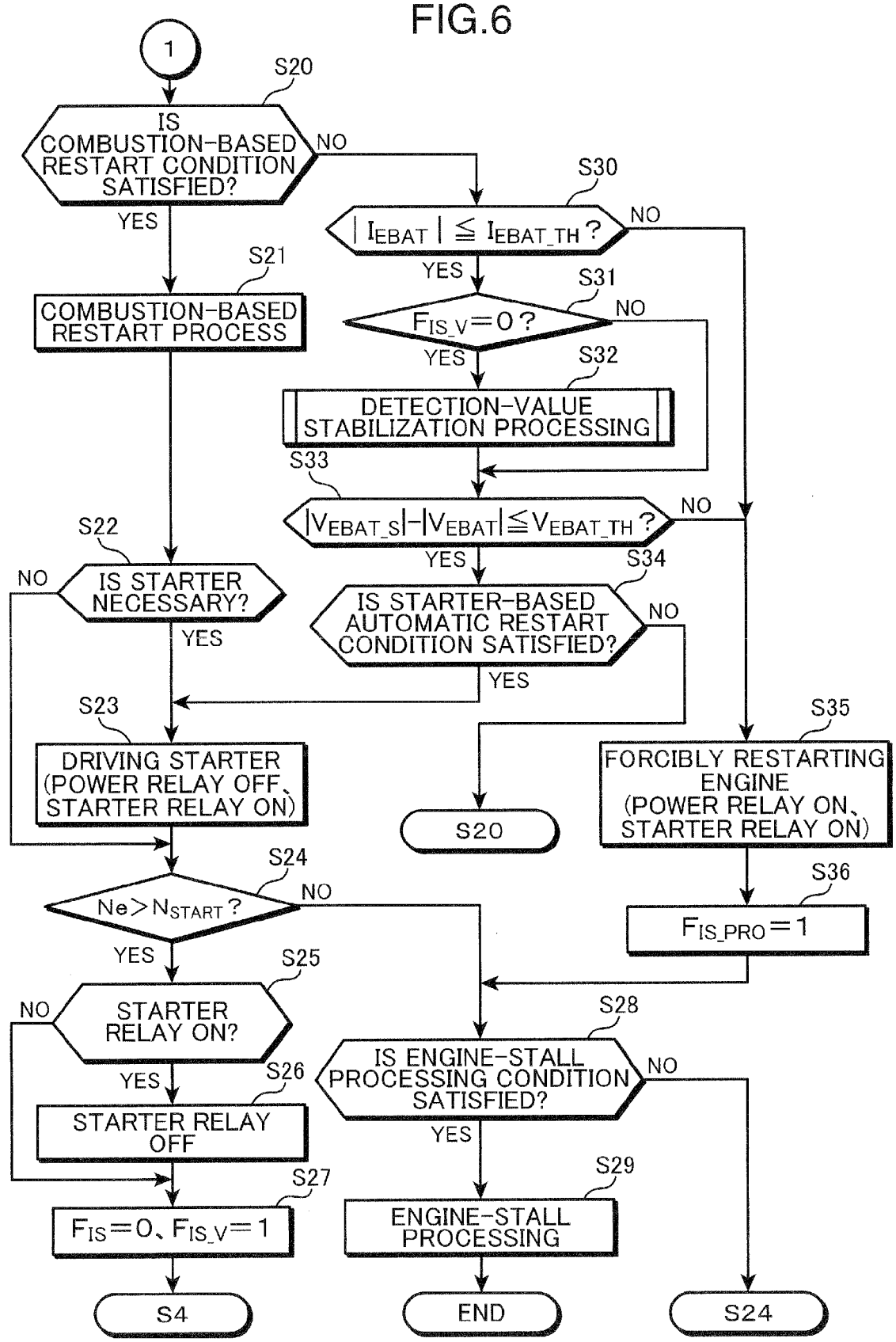

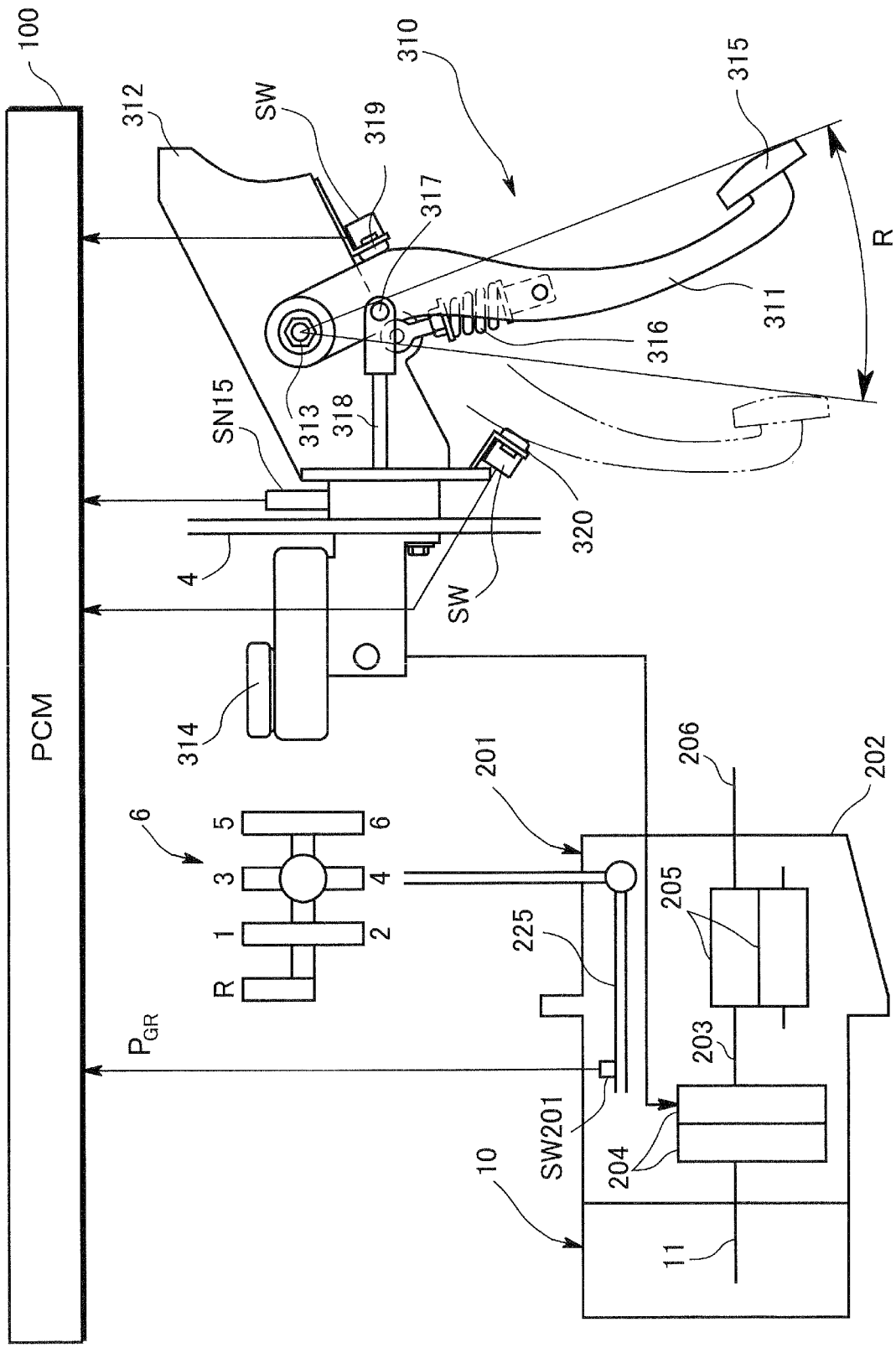

CONTROL METHOD FOR INTERNAL COMBUSTION ENGINE SYSTEM, AND INTERNAL COMBUSTION ENGINE SYSTEM

BACKGROUND OF THE INVENTION

1. Field of the Invention

The present invention relates to an internal combustion engine system control method and an internal combustion engine system, and more particularly to an internal combustion engine system control method and an internal combustion engine system, designed to automatically stop an internal combustion engine, upon satisfaction of a given automatic stop condition, and then automatically restart the internal combustion engine using an electric drive unit.

2. Description of the Background Art

In a control system for an internal combustion engine of a vehicle, there has been known one type designed to, upon satisfaction of a given automatic stop condition (i.e., condition for automatically stopping the internal combustion engine), automatically stop the internal combustion engine, and, upon satisfaction of a given restart condition after the internal combustion engine is automatically stopped, produce combustion of an air-fuel mixture in a stopped-state expansion-stroke cylinder which has been on an expansion stroke at least in an automatically stopped state of the internal combustion engine, so as to automatically restart the internal combustion engine, as disclosed, for example, in JP 2002-118978A (hereinafter referred to as 'Document 1'). In such an internal combustion engine control system employing the above automatic stop/restart control scheme, it is necessary to use an electric drive unit for assisting start-up of the internal combustion engine, relatively frequently, i.e., every time the internal combustion engine is restarted. For this reason, the system disclosed in the Patent Document 1 employs a two-battery system comprising a general-purpose battery and a starter battery, wherein, depending on whether a type of internal combustion engine start-up process is a normal start-up process based on an operator's (driver's) manual operation (primarily, a manual operation of an ignition key switch) or an automatic restart process based on the automatic stop/restart control scheme, one of the two batteries is switchably used to improve an electric power supply capability.

Although the starter battery is generally specialized in supplying electric power to the electric drive unit to automatically restart the internal combustion engine in a state after being automatically stopped according to the automatic stop/restart control scheme, there are some cases where a user post-attaches an electric load, e.g., an accessory component, such as a lamp, to a terminal of the starter battery. In such cases, electric power stored in the starter battery is consumed in a stopped state of the internal combustion engine, and thereby the starter battery will fall into an overload state in which a total electric load exceeds an upper limit in design specifications. The use of the starter battery in the overload state is likely to cause a risk of being unable to ensure sufficient electric power during restart of the internal combustion engine.

It is contemplated to activate the electric drive unit with the support of the general-purpose battery when an amount of electric power stored in the starter battery is insufficient. However, some recent vehicles employ an electric load requiring electric power supply even in a stopped state of an internal combustion engine, such as a hill start assist system (hill holder), and thereby it is often the case that it is not easy to entirely cover required electric power by the general-purpose battery.

SUMMARY OF THE INVENTION

In view of the above problem, it is an object of the present invention to provide an internal combustion engine system control method and an internal combustion engine system, capable of preventing an internal combustion engine in a state after being automatically stopped, from falling into an unrestartable state.

In order to achieve the above object, according to one aspect of the present invention, there is provided a control method for an internal combustion engine system which includes an internal combustion engine, an electric drive unit adapted to start up the internal combustion engine, and a starter battery for use as an electric power source for activating the electric drive unit. The control method comprises: an automatic stop step of, upon satisfaction of a given automatic stop condition, automatically stopping the internal combustion engine being running; a restart step of, upon satisfaction of a given restart condition after the internal combustion engine is automatically stopped, supplying electric power from the starter battery to the electric drive unit to automatically restart the internal combustion engine; a post-attached load detection step of detecting the presence or absence of a post-attached load to be supplied with electric power from the starter battery, based on a discharging status of the starter battery in the automatically stopped state of the internal combustion engine; and a forcible restart step of, when the post-attached load is detected as a result of the post-attached load detection step, restarting the internal combustion engine irrespective of the satisfaction or non-satisfaction of the restart condition.

In cases where a user post-attaches an electric load, e.g., an accessory component, such as a lamp, in such a manner as to use electric power of the starter battery, an amount of electric power stored in the starter battery is likely to reduce in a stopped state of the internal combustion engine. In the control method of the present invention, the presence or absence of such a post-attached load to be supplied with electric power from the starter battery is detected based on a discharging status of the starter battery in the automatically stopped state of the internal combustion engine. Then, when the post-attached load is detected, the internal combustion engine is restarted irrespective of the satisfaction or non-satisfaction of the restart condition. This makes it possible to prevent the automatically stopped internal combustion engine from falling into an unrestartable state.

These and other objects, features and advantages of the present invention will become apparent upon reading of the following detailed description along with the accompanied drawings.

BRIEF DESCRIPTION OF THE DRAWINGS

FIG. 6 is a flowchart showing an automatic restart control process in the internal combustion engine system according to the first embodiment.

FIGS. 7A and 7B illustrate specific examples of a detection-value stabilization processing subroutine in the flowcharts in FIGS. 5 and 6, wherein FIG. 7A is a flowchart showing a technique based on a change rate (differential value) derived by differentiating an absolute value of a detected present voltage value, and FIG. 7B is a flowchart showing a technique based on a deviation of an absolute value of a detected present voltage value.

FIG. 10 is a schematic block diagram showing respective structures of a manual transmission mounted on a vehicle equipped with the internal combustion engine system according to the second embodiment, and a clutch pedal unit for selectively engaging and disengaging a clutch included in the manual transmission.

DESCRIPTION OF THE PREFERRED EMBODIMENTS

Figure 1:
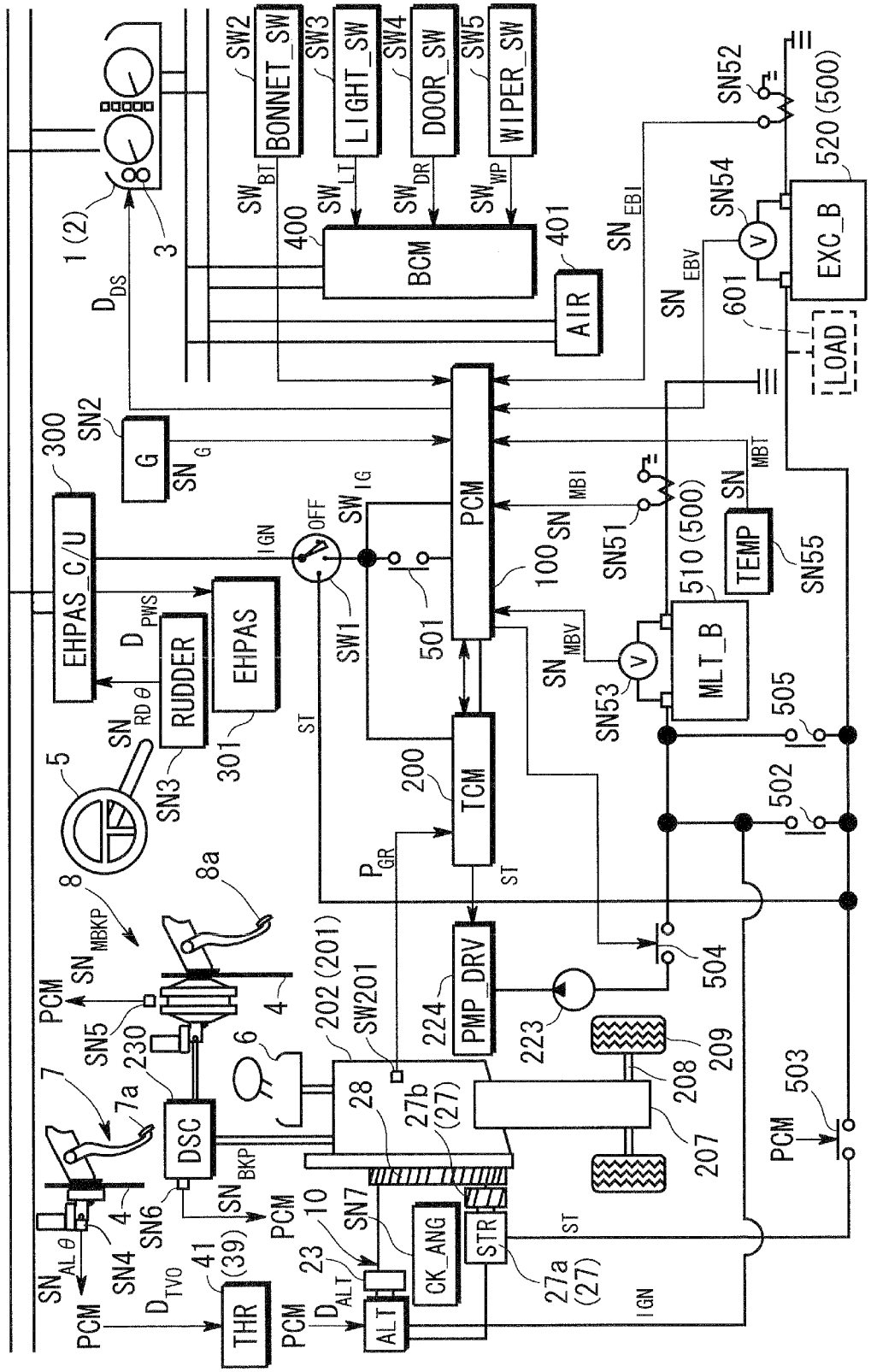
FIG. 1 is a schematic block diagram showing an internal combustion engine system according to a first embodiment of the present invention.

With reference to the accompanying drawings, the present invention will now be described based on a preferred embodiment thereof.

In the following description, a similar element or component between the following embodiments is defined by a common reference numeral or code, and a duplicated description will be omitted.

First Embodiment

FIG. 1 is a schematic block diagram showing an internal combustion engine system according to a first embodiment of the present invention.

Referring to FIG. 1, the internal combustion engine system (a vehicle control system?) comprises a powertrain control module (PCM) 100 operable to control an engine 10 as an internal combustion engine, a transmission control module (TCM) 200 operable to control a transmission 201 coupled to the engine 10 (specifically, the transmission control module 200 is configured as a part of powertrain control module 100), a steering control module (SCM) 300 operable to control a steering unit 301, and a body control module (BCM) 400 operable to control after-mentioned various convenience switches SW2 to SW5 each installed in a vehicle body. Each of the modules 100 to 400 is configured with logic elements. Therefore, practically, two or more of the modules 100 to 400 may be configured in a single integral module, or each of the modules 100 to 400 may be made up of a plurality of sub-modules. Among the modules 100 to 400, at least the powertrain control module 100 generally serves as automatic stop/restart control unit operable, upon satisfaction of a given automatic stop condition, to execute an automatic stop control process of automatically stopping the engine 10, and, upon satisfaction of a given restart condition after the engine 10 is automatically stopped, to produce combustion in a cylinder 15 being on an expansion stroke at least in an automatically stopped state of the engine 10, so as to automatically restart the engine 10, and further operable, upon satisfaction of the restart condition during a course of an engine-stopping operation in the automatic engine stop control process, to resume fuel supply and ignition even before the engine 10 is completely stopped, so as to initiate a restart operation.

In advance of specifically describing each of the modules 100 to 400, a vehicle and the internal combustion engine system mounted on the vehicle will be comprehensively described below.

Referring to FIG. 1, the reference numeral indicates an instrument panel equipped in a passenger compartment of a vehicle. The instrument panel 1 is equipped with an indicator unit 2. The indicator unit 2 is provided with a warning section 3 operable, when a failure occurs in the internal combustion engine system to indicate the system failure. Although not illustrated, the warning section 3 is composed, for example, of a liquid-crystal panel capable of displaying a graphical user interface (GUI) or the like, and/or a speaker capable of outputting an audio warning or the like, and adapted to inform a driver about various warnings, such as lack of oil, based on controls of the modules 100 to 400.

The reference numeral 4 indicates a lower dash panel. The lower dash panel 4 is provided with a steering wheel 5 for allowing a driver to steer the vehicle, a shift lever 6 for manually selecting one of a plurality of shift ranges, an accelerator pedal 7a of an accelerator pedal unit 7, and a brake pedal 8a of a brake unit 8.

The vehicle is provided with an ignition switch SW1 for allowing a driver to start up the engine 10.

Figure 2:
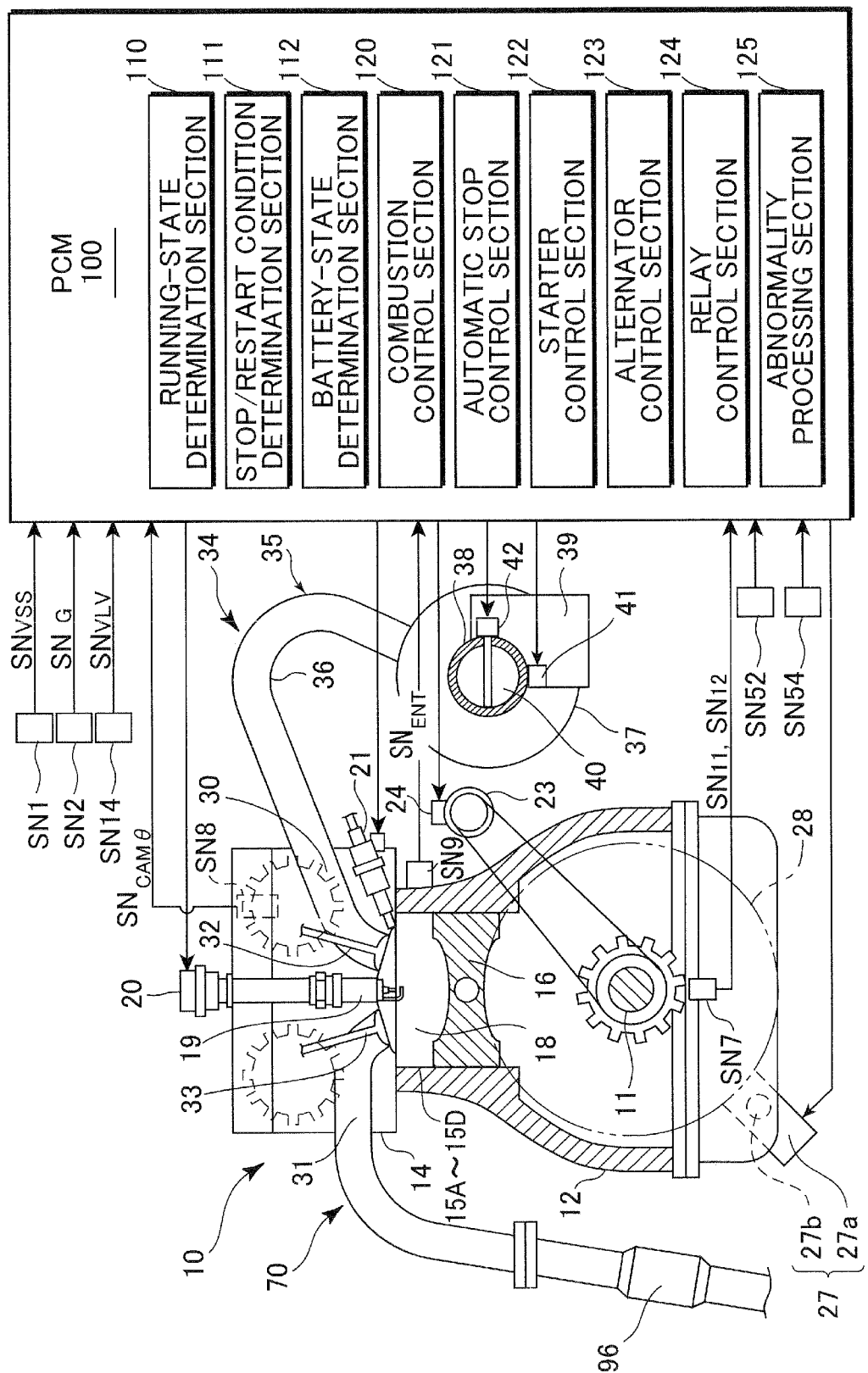
FIG. 2 is a schematic block diagram primarily showing an engine in section, in the internal combustion engine system according to the first embodiment.
Figure 3:
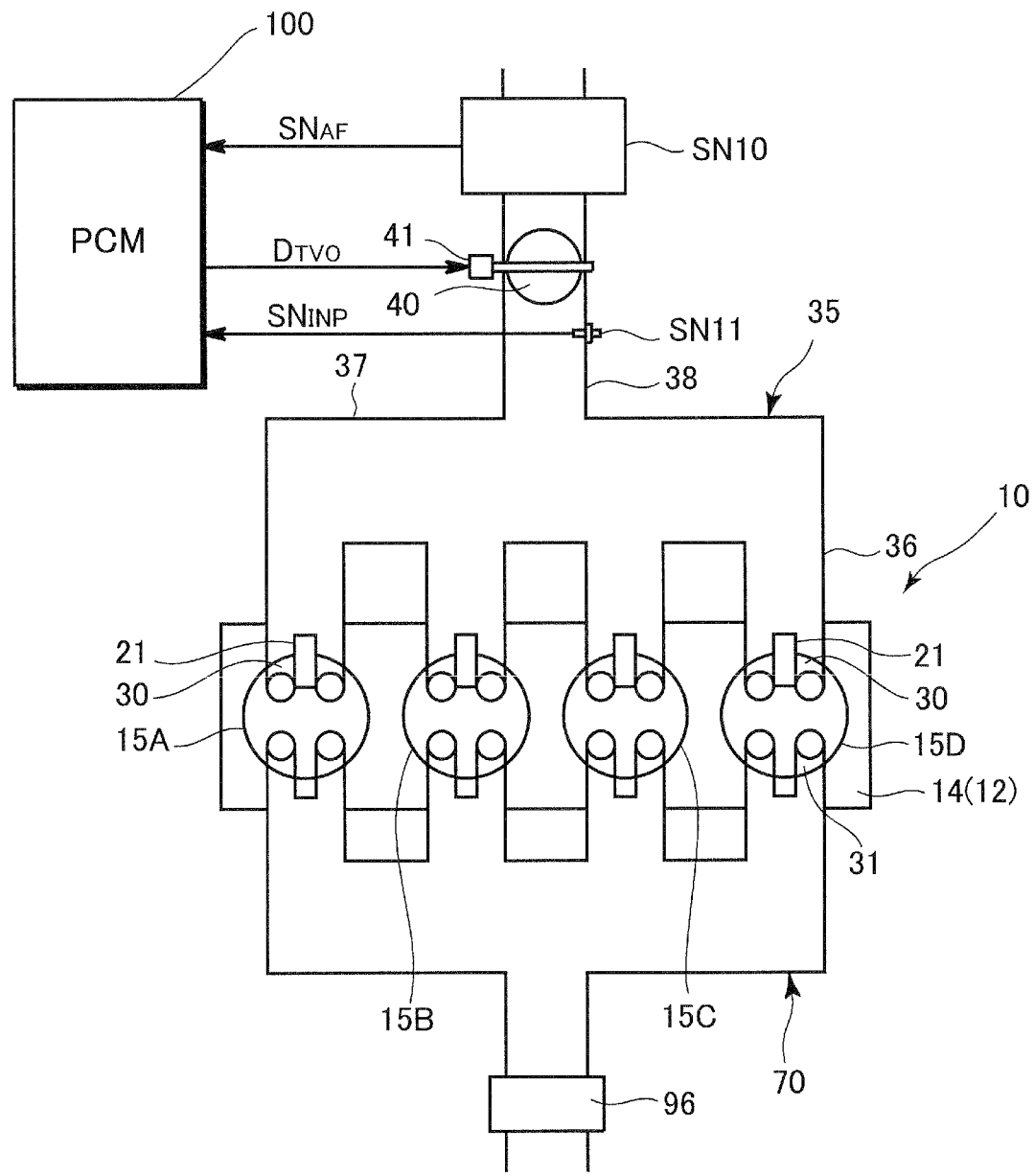
FIG. 3 a schematic block diagram primarily showing the engine in top plan view, in the internal combustion engine system according to the first embodiment.

FIG. 2 is a schematic block diagram primarily showing the engine 10 in section, in the internal combustion engine system according to the first embodiment, and FIG. 3 a schematic block diagram primarily showing the engine 10 in top plan view, in the internal combustion engine system according to the first embodiment.

Referring to FIGS. 1, 2 and 3, the engine 10 is a four-cycle spark-ignition engine which comprises a crankshaft 11 for outputting an engine power, a cylinder block 12 rotatably supporting the crankshaft 12, a cylinder head 14 mounted on a top of the cylinder block 12 to form a housing of the engine 10 in cooperation with the cylinder block 12, and four cylinders 15A to 15D (see FIG. 3) defined by the cylinder block 12 and the cylinder head 14.

The cylinders 15A to 15D have four pistons 16 each of which is fittingly inserted into a respective one thereof and connected to the crankshaft 11 through a separate connecting rod (not shown), so that a combustion chamber 18 is defined above the respective one of the pistons 16. The four pistons 16 provided in the cylinders 15A to 15D are adapted to be moved in an upward-downward direction with a given phase difference between respective ones thereof, while rotating the crankshaft 11.

The engine 10 which is a four-cylinder four-cycle engine, is designed to carry out a combustion cycle consisting of intake, compression, expansion and exhaust strokes with a given phase difference therebetween. Specifically, the engine 10 is designed such that each of the strokes is performed in a 1st cylinder (in the first embodiment, the cylinder 15A), a 3rd cylinder (in the first embodiment, the cylinder 15C), a 4th cylinder (in the first embodiment, the cylinder 15D) and a 2nd cylinder (in the first embodiment, the cylinder 15B) in this order, with a phase difference of 180 degrees crank angle (180° CA).

The cylinder head 14 has four spark plugs 19 provided to the respective combustion chambers 18 of the cylinders 15A to 15D in such a manner to allow an electrode at a distal end of each of the spark plugs 19 to be exposed to a corresponding one of the combustion chambers 18. Each of the spark plugs 19 is attached to the cylinder head 14 using a conventional fastening structure, such as a thread engagement structure. The spark plugs 19 are adapted to be activated by four ignition devices 20 each associated with a respective one thereof. Specifically, each of the ignition devices 20 is operable, in response to receiving a control signal $D_{IG}$ from the powertrain control module 100, to supply a current to a corresponding one of the spark plugs 19 to allow the corresponding spark plug 19 to generate a spark at a desired ignition timing.

The cylinder head 14 further has four fuel injection valves 21 each disposed on an outer peripheral side of a respective one of the combustion chambers 18 to directly inject fuel into the combustion chamber 18. Each of the fuel injection valves 21 is internally provided with a needle valve (not shown) and a solenoid (not shown), and adapted to be drivenly opened only for a time corresponding to a pulse width of a pulse signal $D_{FL}$ input from an after-mentioned combustion control section 120 (see FIG. 2) of the powertrain control module 100 to inject fuel toward the electrode of the corresponding spark plug 19 in an amount depending on the valve opening time.

As shown in FIGS. 1 and 2, an alternator 23 is disposed adjacent to the engine 10 and drivenly coupled to the crankshaft 11 through a timing belt or the like. The alternator 23 is internally provided with a regulator circuit 24 for controlling a current of a field coil (not shown) to change an output voltage so as to adjust a power generation amount (i.e., output power) thereof. Specifically, the regulator circuit 24 is operable, based on a control signal input from the powertrain control module 100 (see FIG. 2), to control the output power, depending on an electric load (see FIGS. 1 and 4) of the vehicle, respective voltage values $V_{MBAT}$, $V_{EBAT}$ of two batteries 510, 520 (see FIGS. 1 and 4) of an after-mentioned electric-power supply system 500 mounted on the vehicle, and others.

The engine 10 is provided with a starter unit 27 operable to giving a driving force to the crankshaft 11 to start up the engine 10. The starter unit 27 comprises a starter motor 27a (electric motor), and a pinion gear 27b. An output shaft of the starter motor 27a is shared as a rotary shaft of the pinion gear 27b, and the pinion gear 27b is adapted to be reciprocatingly moved along the rotary shaft. The crankshaft 11 is provided with a flywheel (not shown) and a ring gear 28 fixed to the flywheel, in a concentric arrangement with respect to a rotational axis of the crankshaft 11. In a process of starting up the engine 10 using the starter unit 27, the pinion gear 27a is moved to a given meshing position and meshed with the ring gear 28 to drivingly rotate (crank) the crankshaft 11.

The cylinder head 14 has four portions each of which is located above a respective one of the cylinders 15A to 15D and formed with a pair of intake ports 30 and a pair of exhaust ports 31 each opened to a corresponding one of the combustion chambers 18, wherein an intake valve 32 is attached to a connection portion between a respective one of the intake ports 30 and the combustion chamber 10, and an exhaust valve 33 is attached to a connection portion between a respective one of the exhaust ports 31 and the combustion chamber 10. Each of the intake ports 30 is connected to an intake passage 35, and each of the exhaust ports 31 is connected to an exhaust passage 70. As shown in FIG. 3, the intake passage 21 has a downstream portion located adjacent to the intake ports 30 and formed as four branched intake passages 36 independently branched correspondingly to respective ones of the cylinders 15A to 15D, and a surge tank 37 communicated with respective upstream ends of the branched intake passages 36. Further, the intake passage 21 has a common intake passage 38 located upstream of the surge tank 37. The common intake passage 38 is provided with a throttle body 39. The throttle body 39 is provided with a throttle valve 40 capable of adjusting an amount of air to be supplied to each of the cylinders 15A to 15D, an actuator 41 adapted to drivingly move the throttle valve 40, and an idling speed control (ISC) device 42. In the first embodiment, the idling speed control device 42 is an electromagnetically-driven type capable of changing a valve opening amount by the after-mentioned combustion control section 120 of the powertrain control module 100.

As shown in FIG. 2, the exhaust passage 70 is provided with a catalytic converter 96 for purifying exhaust gas.

Referring to FIG. 1, a transmission 201 is coupled to the engine 10.

Figure 4:
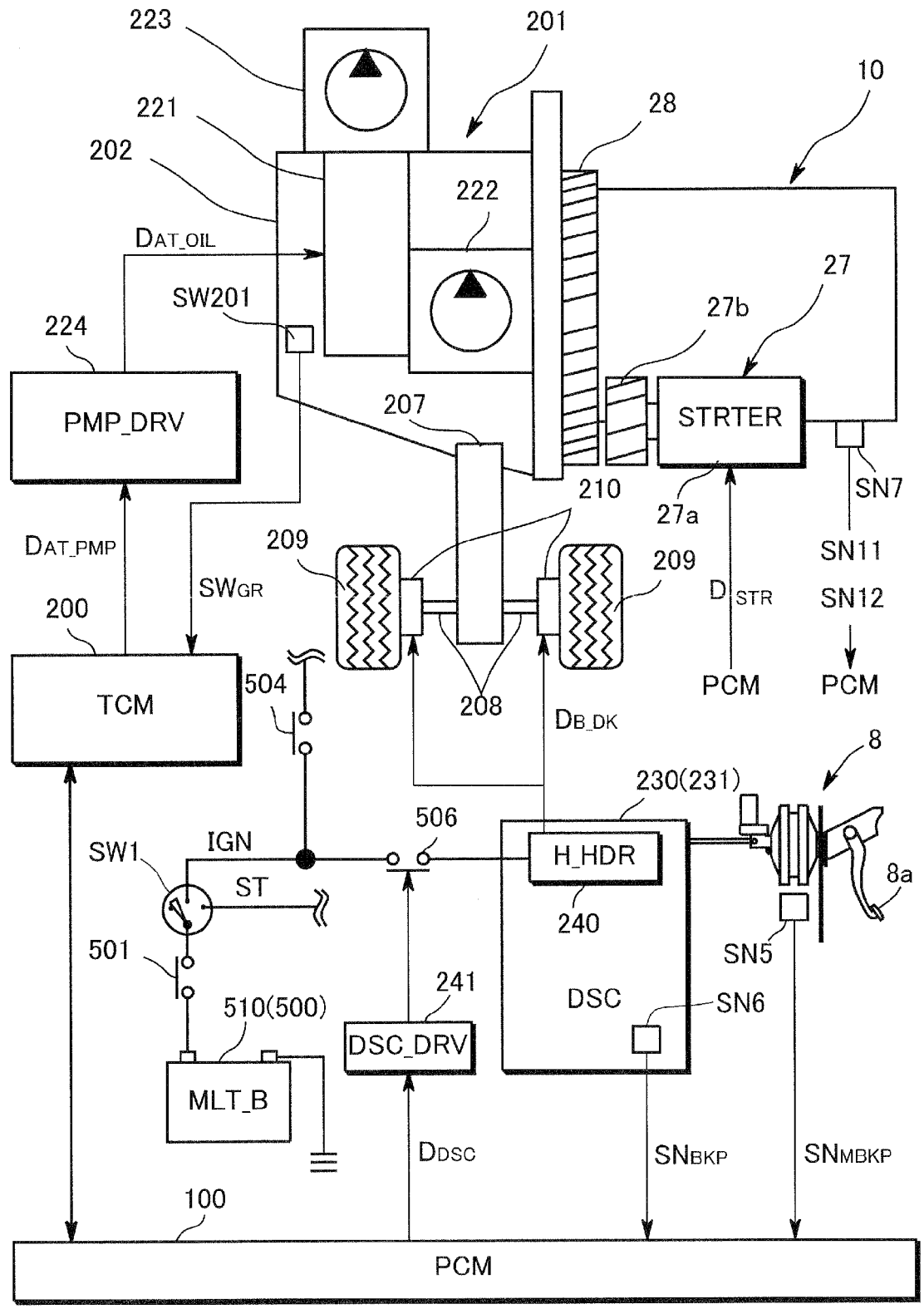
FIG. 4 is a fragmentary schematic block diagram showing a vehicle equipped with the internal combustion engine system according to the first embodiment.

FIG. 4 is a fragmentary schematic block diagram showing the vehicle equipped with the internal combustion engine system according to the first embodiment.

Referring to FIG. 4, the transmission 201 is mounted on the vehicle in adjacent relation to the engine 10. The transmission 201 is a mechanism for converting an engine power input from the crankshaft 11 of the engine 10, into a drive power having an appropriate rotational speed and an appropriate torque, automatically (and manually according to a selection by a driver), and transmitting the drive power to a drive axle 208 of the vehicle through a differential mechanism 207. The transmission 201 comprises a torque converter (not shown) and a hydraulic mechanism 221. Although not illustrated, the hydraulic mechanism 221 includes a plurality of hydraulic clutches, a plurality of hydraulic brakes, and a valve assembly for selectively engaging and disengaging each of the hydraulic clutches and brakes.

The valve assembly of the hydraulic mechanism 221 includes a plurality of solenoid valves, and a plurality of spool valves. The transmission control module 200 is operable to send a control signal $D_{AT\_OIL}$ to each of the solenoid valves to adjust a level of working oil pressure (line pressure) to be supplied to each of the hydraulic clutches and brakes, and change target ones of the hydraulic clutches and brakes to be engaged, based on the control signal $D_{AT\_OIL}$, so as to change gear ratios.

A mechanical oil pump 222 and an electric oil pump 223 are provided as an oil pressure source of the hydraulic mechanism 221. The mechanical oil pump 222 has the same structure as that of a type commonly used in a conventional transmission, wherein a rotor of the mechanical oil pump 222 is directly connected to the crankshaft 11 of the engine 10. Thus, the mechanical oil pump 222 is driven in conjunction with running of the engine 10. Based on driving the mechanical oil pump 222 by the engine 10, the hydraulic mechanism 221 is effectively activated. That is, the transmission 201 is placed in a power transmittable state. In the first embodiment, during a normal running of the engine 10, the mechanical oil pump 222 is used in principle.

The electric oil pump 223 is provided in addition to the mechanical oil pump 222, and used independently or in combination with the mechanical oil pump 222. The electric oil pump 223 is driven by a transmission pump driver 224. The transmission pump driver 224 is internally provided with an electric motor (not shown), and operable to drive a rotor of the electric oil pump 223 by electric power from the after-mentioned general-purpose battery 510. Thus, even in a stopped state (as used herein, the term "stopped state" include an automatically stopped state) of the engine 10, the electric oil pump 223 can generate an oil pressure and supply the generated oil pressure to the hydraulic mechanism 221. In the first embodiment, the electric oil pump 223 is used for placing the transmission 201 in the power transmittable state, primarily in an automatically stopped state of the engine 10 or just after initiation of restart of the automatically stopped engine 10. Under such use conditions, a line pressure required for the hydraulic mechanism 221 is relatively low, and therefore a load to be imposed on the electric oil pump 223 is relatively low. Thus, a small-size/low-capacity type is employed as each of the electric oil pump 223 and the transmission pump driver 224.

In the vehicle equipped with the internal combustion engine system according to the first embodiment, the brake unit 8 is connected to a dynamic stability control (DSC) system 230. The dynamic stability control system 230 logically comprises a determination section for determining a traveling condition of the vehicle based on signals from various sensors installed in the vehicle, a course prediction section for predicting a course of the vehicle based on information processed by the determination section, and a detection section for detecting a slip of road wheels 209 of the vehicle. The dynamic stability control system 230 is operable, when the brake pedal 8a (or the steering wheel 5) is operated appropriately for (correspondingly to?) the predicted course, to automatically correct an amount of the operation to prevent an involuntary behavior of the vehicle due to a human factor of a driver.

In the first embodiment, the dynamic stability control system 230 includes a hill holder unit 240. The hill holder unit 240 is a mechanism for controlling a braking force of a hydraulic disc brake 210 mounted to the drive axle 208 of the vehicle to prevent the vehicle from involuntarily moving backwardly during hill start of the vehicle. The dynamic stability control system 230 is connected to the powertrain control module 100 through a DSC driver 231 and adapted to be controlled by the powertrain control module 100.

Referring to FIG. 1, in the vehicle equipped with the internal combustion engine system according to the first embodiment, the steering unit 301 is embodied as an electro-hydraulic power-assisted steering (EHPAS) unit which is operable to assist a steering force of the steering wheel 5 by a motor (not shown).

The vehicle is equipped with various conveniences (electric components) including an air-conditioning unit, and provided with a bonnet switch SW2 operable to output a signal $SW_{BT}$ indicative of opening and closing of a bonnet of the vehicle body, a light switch SW3 operable to output a signal $SW_{LT}$ indicative of turn-on and turn-off of a light, a door switch SW4 operable to output a signal $SW_{DR}$ indicative of an open/closed state of a door, and a wiper switch SW5 operable to output a signal $SW_{WP}$ indicative of an operation of a wiper. The body control module 400 is operable, based on the signals $SW_{BT}$, $SW_{LT}$, $SW_{DR}$, $SW_{WP}$ input from the switches SW2 to SW5, to control the vehicle in cooperation with the powertrain control module 100.

An electric-power supply system 500 in the internal combustion engine system according to the first embodiment will be described below.

Referring to FIGS. 1 to 4, the electric-power supply system 500 is a two-battery system which comprises the ignition switch SW1 adapted to be operated from the side of the passenger compartment, an electric power supply line to be formed through after-mentioned relays 501 to 506, a general-purpose battery 510 connected to an electric load (e.g., the indicator unit 2, the warning section 3, the ignition devices 20, solenoids (not shown) for controlling the fuel injection valves 31, the regulator circuit 24 of the alternator 23, the starter motor 27a of the starter unit 27, the actuator 41 for driving the throttle valve 40, the idling speed control device 42, the valve assembly of the hydraulic mechanism 221, the electric oil pump 223, the dynamic stability control system 230, an antilock braking system (ABS) (not shown), the steering unit 301, respective driver for the above units and systems, and the modules 100 to 400: in the following description, "electric loads" will be used as a generic term for these loads) via the electric power supply line, and a starter battery 520 for supplying electric power, particularly, for driving the starter motor 27a of the starter unit 27 in the electric loads.

In the automatic stop/restart control scheme, the two-battery system has the following advantage. In the first embodiment, there are some cases where the starter unit 27 is driven during restart of the automatically stopped engine, as will be described later. In such cases, a relatively large current is required to drive the starter unit 27, and thereby a battery voltage temporarily drops. Although the temporary voltage drop does not cause any problem for some electric loads, such as various lights and a defogging system, it is undesirable for many electric loads, such as an airbag control unit, an electrohydraulic power-assisted steering (EHPAS) control unit, a navigation system, an audio system and various meters. In the first embodiment, the general-purpose battery 510 having a relatively high capacity is used for supplying electric power to the electric loads, except the starter motor 27a, at a stable voltage, and the single-purpose starter battery 520 is used for supplying electric power to the starter unit 27, so that, even if a voltage of the starter battery 520 temporarily drops due to driving of the starter unit 27 during the restart, the adverse effect on the electric loads other than the starter motor 27a can be minimized.

The ignition key switch SW1 has an input contact, an OFF contact, an output contact and a starter activation contact. The input contact of the ignition key switch SW1 is connected to an output terminal of the general-purpose battery 510.

A main relay 501 having an A-contact is connected between the input contact of the ignition key switch SW1 and the general-purpose battery 510. The main relay 510 is adapted to be selectively opened and closed under control of the powertrain control module 100. A fail-safe function for the entire system is ensured by the main relay 501.

The electric loads, except the starter motor 27a, are connected in parallel with the output contact of the ignition key switch SW1.

The starter motor 27a of the starter 27 is connected to the general-purpose battery 510 via a power relay 502 having an A-contact. Thus, while no electric power is supplied to the starter unit 27 when the power relay 502 is in an open position, an electric power supply to the starter unit 27 is enabled when the power relay 502 is in a closed position. Further, the starter motor 27a is also connected to the starter activation contact of the ignition key switch SW1 through a wire harness (line indicated by ST in FIG. 1) branched upstream of the power relay 502. A driver (not shown) for driving the starter motor 27a is connected to the starter activation contact of the ignition key switch SW1.

Each of the power relay 502 and a starter relay 503 connected to the starter motor 27a is adapted to be selectively opened and closed under control of the powertrain control module 100 through a driver (not shown). In particular, the driver for the starter relay 503 is configured as a self-holding circuit which is operable, when an electromotive force is generated at the starter activation contact for a given time, to close the circuit so as to close the starter relay 503 for the starter motor 27a, and, according to control of the powertrain control module 100, to open the circuit so as to open the starter relay 503.

In the same manner as other electric loads, the electric oil pump 223 is connected to the output contact of the ignition key switch SW1 via an AT pump relay 504 having an A-contact. Thus, while no electric power is supplied to the transmission pump driver 224 when the AT pump relay 504 is in an open position, an electric power supply to the transmission pump driver 224 is enabled when the AT pump relay 504 is in a closed position. Further, the dynamic stability control system 230 incorporating the hill holder unit 240 is connected to the output contact of the ignition key switch SW1 via a DSC relay 506.

Among the above electric loads, for example, the DSC relay 506 is kept in a closed position even in the stopped state of the engine 10, to allow the dynamic stability control system 230 and the hill holder unit 240 incorporated therein to be activated even in the stopped state of the engine 10 so as to cope with an unanticipated situation to maximally ensure safety of the vehicle.

The starter battery 520 is a type having a capacity less than that of the general-purpose battery 510, and is exclusively used for driving the starter unit 27. The starter battery 520 is connected to the starter unit 27 via the starter relay 503, so as to supply electric power to the starter unit 27. The starter battery 520 is further connected to the alternator 23 via a charge relay 505. Thus, when the charge relay 505 is closed, electric power generated by the alternator 23 is also charged into the starter battery 520. The charge relay 505 is interposed between an upstreammost portion of a line connected to the output terminal of the general-purpose battery 510 and an upstreammost portion of a line connected to an output terminal of the starter battery 520.

The vehicle is provided with a vehicle speed sensor SN1 for detecting a traveling speed of the vehicle, an acceleration sensor SN2 for detecting an acceleration of the vehicle, a steering angle sensor SN3 for detecting a rotational angle RD θ of the steering wheel 5 provided in the passenger compartment, an accelerator-pedal angular position sensor SN4 for detecting an accelerator-pedal angular position AL θ based on an amount of depression of the accelerator pedal 7a, a master-cylinder negative-pressure sensor SN5 provided in the brake unit 8, and a brake oil pressure sensor SN6 incorporated in the dynamic stability control system 230. The sensors SN1 to SN6 are operable to output signals $SN_{VSS}$, $SN_G$, $SN_{RD\,\theta}$, $SN_{AL\,\theta}$, $SN_{MBKP}$, $SN_{BKP}$ output, respectively. These output signals are input into the powertrain control module 100 directly or indirectly.

The engine 10 is provided with a crank angle sensor SN7 having two sensor elements for detecting a rotational angle (crank angle CA) of the crankshaft 11. The sensor elements of the crank angle sensor SN7 are operable to output signals $SN_{11}$, $SN_{12}$ for use in calculation of an engine speed Ne, respectively. The sensor elements of the crank angle sensor SN7 are arranged to output the signals $SN_{11}$, $SN_{12}$ with a phase difference therebetween in order to detect the crank angle CA of the engine 10. The output signals $SN_{11}$, $SN_{12}$ of the crank angle sensor SN7 are input into the powertrain control module 100 to detect the engine speed Ne and the crank angle CA.

The engine 10 is further provided with a cam phase sensor SN8 for detecting a phase $\theta_{CAM}$ of an intake-side camshaft (not shown), a coolant temperature sensor SN9 for detecting a coolant temperature $T_{ENG}$, an airflow sensor SN10 provided upstream of the throttle valve 40 to detect an intake-air volume, and an intake pressure sensor SN11 provided downstream of the throttle valve 40 to detect an intake pressure. The sensors SN7 to SN11 are operable to output signals $SN_{11}$, $SN_{12}$, $SN_{CAM\,\theta}$, $SN_{ENT}$, $SN_{AF}$, $SN_{INP}$, respectively. The output signals $SN_{11}$, $SN_{12}$, $SN_{CAM\,\theta}$, $SN_{ENT}$, $SN_{AF}$, $SN_{INP}$ are input into the powertrain control module 100.

The transmission 201 has a gear position switch SW201 disposed in a gear box 202 to detect each of a plurality of speed stages. The gear position switch SW201 is operable to output a signal $SW_{GR}$. The output signal $SW_{GR}$ is input into the transmission control module 200 (i.e., into the powertrain control module 100).

The electric power supply system in the first embodiment is provided with two current sensors SN51, SN52 for detecting respective current values $I_{MBAT}$, $I_{EBAT}$ of the batteries 510, 520, and two voltage sensors SN53, SN54 for detecting respective voltage values $V_{MBAT}$, $V_{EBAT}$ of the batteries 510, 520. The sensors SN51 to SN54 are operable to output signals $SN_{MBI}$, $SN_{EBI}$, $SN_{MBV}$, $SN_{EBV}$, respectively. The output signals $SN_{MBI}$, $SN_{EBI}$, $SN_{MBV}$, $SN_{EBV}$ are input into the powertrain control module 100. In the first embodiment, a battery temperature sensor SN55 is provided to detect a temperature $T_{EBAT}$ of the general-purpose battery 510. The battery temperature sensor SN55 is operable to output a signal $SN_{EBAT\_T}$. The output signal $SN_{EBAT\_T}$ is also input into the powertrain control module 100.

Referring to FIG. 2, the powertrain control module 100 is composed of a microprocessor having a CPU, a memory, a group of counters/timers, an interface and a bus connecting them, and reserves as a means to comprehensively control the engine 10 and the transmission 201 (a combination of the engine 10 and the transmission 201 is also referred to as "power train (PT)") and the electric loads of the vehicle.

The sensors SN1 to SN55 as input elements, and the switches SW1 to SW201, are connected to the powertrain control module 100, directly or indirectly, as mentioned above. The powertrain control module 100 is operable to output a control signal to each of a plurality of control targets as output elements (the electric loads including the ignition devices 20, the fuel injection valves 21 and the alternator 23, the starter unit 27, the throttle valve 40, the hydraulic mechanism 221 of the transmission 201, the air-conditioning unit 401, etc.: in the following description, "control targets" will be used as a generic term for these elements).

In the first embodiment, the powertrain control module 100 logically comprises a running-state determination section 110, a stop/restart condition determination section 111, a battery-state determination section 112, a combustion control section 120, an automatic stop control section 121, a starter control section 122, a relay control section 124, and an abnormality processing section 125.

The running-state determination section 110 is designed to determine a running state of the engine 10 mounted on the vehicle, based on detection values of the sensors SN1 to SN8, the switches SW1 to SW201, etc.

The stop/restart condition determination section 111 is designed to determine whether each of a given automatic stop condition and a given restart condition is satisfied, based on detection values of the sensors SN1 to SN8, the switches SW1 to SW201, etc., functionally in the same manner as that in (or in cooperation with) the running-state determination section 110, to allow the automatic stop/restart processes to be executed in such a manner as to, upon satisfaction of the automatic stop condition, automatically stopping the engine 10, and, upon satisfaction of the restart condition after the engine 10 is automatically stopped, automatically restarting the engine 10. In the first embodiment, the automatic stop condition includes a condition that the engine 10 is running at an idling speed, a condition that a vehicle speed VSS is a given value or less (including a stopped state of the vehicle), a condition that the brake pedal 8a is depressed (for example, a brake oil pressure BKP detected by the brake oil pressure sensor SN6 is a given value or more), a condition that the coolant temperature $T_{ENG}$ detected by the coolant temperature sensor SN9 is a given value (e.g., 80° C.) or more, a condition that the air-conditioning unit 401 is stopped, and a condition that the charge relay 505 is in an open position. When all the above conditions are satisfied, the stop/restart condition determination section 111 determines that the automatic stop condition is satisfied.

In the first embodiment, the restart condition includes at least a condition that the speed stage of the transmission 201 is in a neutral stage, and a condition that at least one of the above automatic stop conditions is released. When the speed stage of the transmission 201 is in a neutral stage, and at least one of the automatic stop conditions is released, the stop/restart condition determination section 111 determines that the restart condition is satisfied.

A start-up process of the engine 10 includes a "combustion-based restart" process of restarting the automatically stopped engine 10 only by means of combustion without using the starter unit 27, and a "starter-based start-up" process of starting up the stopped engine 10 using the starter unit 27 (the starter-based start-up process includes a starter-assisted start-up process of initially restarting the stopped engine 10 based on the combustion-based restart process and then starting up the engine 10 with the assistance of the starter unit 27). The starter-based start-up process includes a "key operation-based start-up" process of driving the starter unit 27 based on a driver's manual operation of the ignition key switch SW1 (see FIG. 1) to start up the engine 10, and a "starter-based automatic restart" process of automatically driving the starter unit 27 under control of the starter control section 122 (see FIG. 2) of the powertrain control module 100 to restart the automatically stopped engine 10. Thus, the stop/restart condition determination section 111 is configured to determine the satisfaction or non-satisfaction of a restart condition for the "combustion-based restart" process, and the satisfaction or non-satisfaction of a restart condition for the "starter-based automatic restart" process, separately, based on a piston stop position of the automatically stopped engine 10, and others.

The combustion control section 120 is designed to adequately set a throttle opening (intake-air volume) TVO, a fuel injection amount $Q_{FL}$ (and a fuel injection timing $T_{FL}$) and an ignition timing $T_{IG}$ of the engine 10, based on the respective output signals $SN_{AL\ \theta}$, $SN_{11}$, $SN_{12}$, $SN_{CAM\ \theta}$, $SN_{ENT}$, $SN_{AF}$, $SN_{INP}$ from the accelerator-pedal angular position sensor SN4, the crank angle sensor SN7, the cam phase sensor SN8, the coolant temperature sensor SN9, the airflow sensor SN10 and the intake pressure sensor SN11, and output respective control signals $D_{TVO}$, $D_{FL\_Q}$, $D_{IG}$ of the throttle opening TVO, the fuel injection amount $Q_{FL}$ (fuel injection timing $T_{FL}$) and the ignition timing $T_{IG}$ to each of the fuel injection valves 21, the throttle valves 40 (actuator 41 thereof) and each of the ignition devices 20, respectively.

The battery-state determination section 112 is designed to detect an amount of electric power stored in each of the batteries 510, 520, and an electric power supply state, based on the current values $I_{MBAT}$, $I_{EBAT}$, and the voltage values $V_{MBAT}$, $V_{EBAT}$ detected by the current sensors SN51, SN52 and the voltage sensors SN53, SN54 provided to the batteries 510, 520, respectively. In the first embodiment, the battery-state determination section 112 is configured as stopped-state current (voltage)-value diagnosis unit operable to execute a stopped-state current (voltage)-value diagnosis step of comparing a value of the current $I_{EBAT}$ flowing out of the starter battery 520 (or an absolute value of a change in (differential value of) the voltage $V_{EBAT}$) with a given current value $I_{EBAT\_TH}$ (or a given voltage value $V_{EBAT\_TH}$), in an automatically stopped state of the engine 10, and a running-state current (voltage)-value diagnosis unit operable to execute a running-state current (voltage)-value diagnosis step of comparing a value of the current $I_{EBAT}$ flowing out of the starter battery 520 (or an absolute value of a change in (differential value of) the voltage $V_{EBAT}$) with the given current value $I_{EBAT\_TH}$ (or the given voltage value $V_{EBAT\_TH}$), upon satisfaction of the automatic stop condition during running of the engine 10, so as to serve as post-attached load detection unit operable to execute a post-attached load detection step of detecting the presence or absence of a post-attached load 610 to be supplied with electric power from the starter battery 520, based on a discharging status of the starter battery 520.

In the first embodiment, the automatic stop control section 121 is configured as a principal part of automatic stop unit operable, in cooperation with the running-state determination section 110, the stop/restart condition determination section 111, the battery-state determination section 112 the combustion control section 120 and others, to execute an automatic stop step of, upon satisfaction of the given automatic stop condition, controlling the alternator 23, the throttle actuator 41, the fuel injection valves 21, the ignition devices 20 and others to automatically stop the engine 10 being running, and a principal part of restart unit operable, in cooperation with the running-state determination section 110, the stop/restart condition determination section 111, the battery-state determination section 112, the combustion control section 120 and others, to execute a restart step of, upon satisfaction of the given restart condition after the internal combustion engine is automatically stopped, supplying electric power from the starter battery 520 to the starter unit 27 to automatically restart the engine 10. In particular, the automatic stop control section 121 is also configured as forcible restart unit operable to execute a forcible restart step of, when the value of the current $I_{EBAT}$ flowing out of the starter battery 520 (or the change in (differential value of) the voltage $V_{EBAT}$) is greater than the given current value $I_{EBAT\_TH}$ (or the given voltage value $V_{EBAT\_TH}$), restarting the engine 10 irrespective of the satisfaction or non-satisfaction of the restart condition, as will be described in more detail later. For example, the voltage $V_{EBAT}$ of the starter battery 520 may be detected using as a parameter an engine speed during cranking based on the starter unit 27 (cranking speed), in such a manner that, when the cranking speed is greater than a given engine speed (e.g., 50 rpm), a charge state status of the starter battery 520 is determined to be adequate, and when the cranking speed is equal to or less than the given engine speed, the charge state of the starter battery 520 is determined to be inadequate.

The starter control section 122 is designed to send a control signal $D_{STR}$ to the starter unit 27 to drive the starter unit 27, when it is necessary to drive the starter unit 27 by the key operation-based start-up process using the ignition key switch SW1, and during restart in the automatic stop/restart control processes.

The relay control section 124 is designed to selectively open and close each of the power relay 502, the charge relay 505 and the AT pump relay 504 (see FIG. 4) according to need, in cooperation with the automatic stop control section 121 and others. In the first embodiment, the relay control section 124 has an electric load control function of activating each of the electric loads or changing an operating condition of the electric load, automatically or based on a manual switch operation by a driver or a passenger. During the normal running of the engine 10, the relay control section 124 is operable to selectively open and close each of the relays 501 to 506 to allow electric power to be supplied from the general-purpose battery 124 to each of the electric loads. During start-up of the engine 10, the relay control section 124 is basically operable to selectively open and close each of the relays 501 to 506 to allow electric power to be supplied from the starter battery 520 to the starter unit 27. Further, the relay control section 124 is configured to close the power relay 502 in conjunction with closing of the starter relay 503, according to need, to allow electric power to be supplied additionally from the general-purpose battery 510 to the starter unit 27, as will be described in more detail later.

The abnormality processing section 125 is designed to perform a given processing in response to occurrence of various abnormalities, such as stall of the engine 10. For example, the abnormality processing section 125 is operable, upon the occurrence of engine stall, to perform an engine-stall processing, such as a processing of allowing the warning section 3 to perform a given action, and a processing of allowing a preset control flag for engine stall to be initialized. The warning according to abnormality processing section 125 is also performed when the engine 10 is placed in a given stopped state according to the automatic stop control process and when the execution of the automatic stop control process is prohibited, as will be described in more detail later.

The transmission control module 200 is oil-pressure control unit operable to perform control for the hydraulic mechanism 221 of the transmission 201. Specifically, the transmission control module 200 is operable to send a control signal to each of a plurality of solenoid valves in the hydraulic mechanism 221. For example, the transmission control module 200 is operable, based on a predetermined automatic speed change pattern or a driver's manual operation of the shift lever 6, to send a speed-change control signal to each of the solenoid valves (ON/OFF valves) to change gear ratios. The transmission control module 200 is also operable to send a pressure-regulating signal to a duty-controlled solenoid valve so as to regulate a discharge pressure of the mechanical oil pump 222 or the electric oil pump 223 to an adequate working oil pressure (line pressure) to set the line pressure at a value corresponding to a vehicle traveling state or an engine load (detected, for example by the accelerator-pedal angular position sensor). The transmission control module 200 is further operable to control an operation of the transmission pump driver 224. Specifically, the transmission control module 200 is further operable, during the normal running of the engine 10, to stop the transmission pump driver 224, and, in the automatically stopped state of the engine 10, to instruct the transmission pump driver 224 to drive the electric oil pump 223 in a normal mode. In the normal drive mode, the line pressure is set at a first oil pressure P1 having a relative low value, as mentioned above. When the line pressure in the normal drive mode is maintained at the first oil pressure, the electric oil pump 223 can be continuously driven.

Each of the remaining modules 300, 400 themselves has the same function as that of a conventional module, and its detailed description is omitted. Although each of the transmission control module 200 and the modules 300, 400 is formed as a logically separate module from the powertrain control module 100, all the modules are configured to control the vehicle in cooperation with each other.

The automatic stop/restart control processes to be executed by the powertrain control module 100 will be specifically described below.

Figure 5:
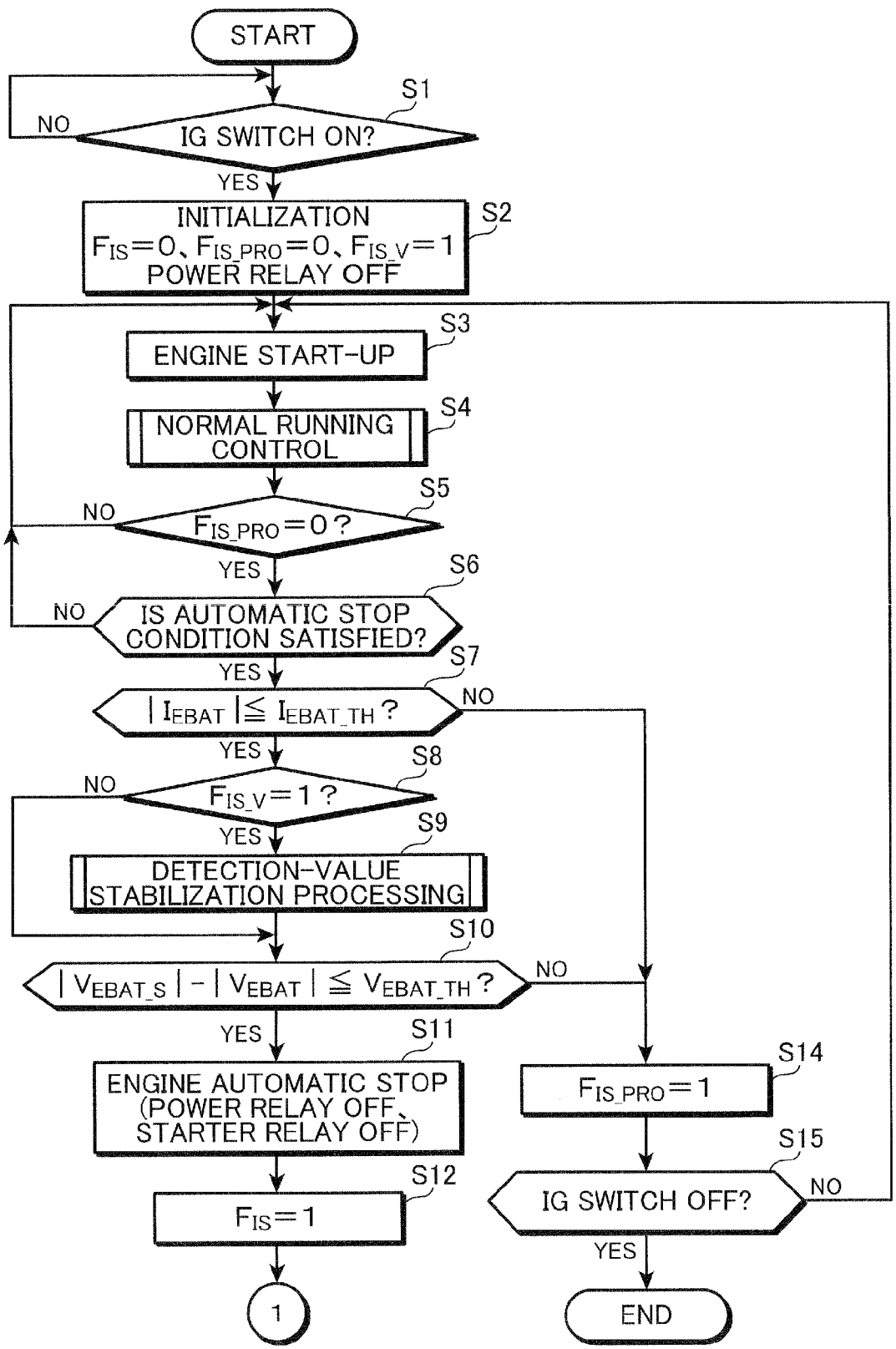
FIG. 5 is a flowchart showing an automatic stop control process in the internal combustion engine system according to the first embodiment.

FIG. 5 is a flowchart showing the automatic stop control process in the internal combustion engine system according to the first embodiment.

Referring to FIG. 5, the powertrain control module 100 is in a standby state until a driver manually operates the ignition key switch SW1 from the side of the passenger compartment (Step S1). When the ignition key switch SW1 is connected to the starter activation contact for a given time, various control flags $F_{IS}$, $F_{IS\_V}$, $F_{IS\_PRO}$ are initialized (Step S2).

TABLE 1

| Code | Code Name | Value | Condition for setting value |
|---|---|---|---|
| $F_{IS}$ | Automatically stopped state flag | 0 | Initial value |
| | | 0 | State other than automatically stopped state |
| | | 1 | Automatically stopped state |
| $F_{IS\_V}$ | Starter battery state determination flag | 1 | Initial value |
| | | 0 | Need for voltage value stabilization processing |
| | | 1 | No need for voltage value stabilization processing |
| $F_{IS\_PRO}$ | Automatic stop prohibition flag | 0 | Initial value |
| | | 0 | No prohibition on automatic stop control |
| | | 1 | Prohibition of automatic stop control |

As shown in Table 1, an automatically stopped state flag $F_{IS}$ indicates whether the engine 10 is stopped as a result of the automatic stop control process executed by the automatic stop control section 121 in response to satisfaction of the automatic stop condition determined by the stop/restart condition determination section 111. The value 0 indicates a state when the engine 10 is not automatically stopped, such as a state that the automatic restart control process is initiated, and a state when the engine 10 is running. The value 1 indicates an automatically stopped state of the engine 10. An initial value is 0.

A determination flag $F_{IS\_V}$ is used for determining a voltage state of the starter battery 520. The value 0 indicates a state when a voltage of the starter battery 520 is stable enough to be used as a control parameter, and the value 1 indicates a need for subjecting a detection value to a stabilization processing. An initial value is 1.

As used herein, the term "post-attached load" (see 601: indicated by the dotted line in FIG. 1) means an electric load which is connected to an external terminal of the starter battery 520 by a user or the like, in such a manner as to nonconform to specifications of the vehicle. The starter battery is generally specialized in supplying electric power to an electric drive unit (starter unit 27) to automatically restart the internal combustion engine stopped through the automatic stop control process. If the post-attached load is connected to the starter battery 520, the starter battery 520 having a relatively low capacity will supply electric power even in a stopped state of the engine 10, i.e., electric power stored in the starter battery is consumed in the stopped state of the engine 10. Consequently, the starter battery will fall into an overload state in which a total electric load exceeds an upper limit in design specifications. The use of the starter battery 520 in the overload state is likely to cause a risk of being unable to ensure sufficient electric power during restart of the engine 10.

It is contemplated to activate the starter unit with the support of the general-purpose battery 510 when an amount of electric power stored in the starter battery 520 is insufficient. However, as shown in FIG. 4, an electric load requiring electric power supply even in the stopped state of the engine 10, such as the electric oil pump 223, and the dynamic stability control system 230 incorporating the hill holder unit 240 as a hill start assist system, is employed in some cases. Thus, it is often the case that it is not easy to entirely cover required electric power by the general-purpose battery 510.

For this reason, in the first embodiment, a state of the starter battery 520 is detected at a given timing, and, if the post-attached load 610 is detected, the execution of the automatic stop control process is prohibited, or the engine 10 in the automatically stopped state is forcibly started up.

When the post-attached load 610 is detected, an automatic stop prohibition flag $F_{IS\_PRO}$ is updated to prohibit a subsequent operation of the automatic stop control process for the engine 10. The value 0 indicates a state when no post-attached load 601 is detected, and the value 1 indicates a detection of the post-attached load 601. An initial value is 0.

Each of the powertrain control module 100 and other modules 200 to 400 is in a standby state until the ignition key switch SW1 is connected (Step S1), and, when the ignition key switch SW1 is manually operated to connect the input contact to the starter activation contact, various control environments including the flags $F_{IS}$, $F_{IS\_V}$, $F_{IS\_PRO}$ are initialized (Step S2), as mentioned above. Then, each of the modules 100 to 400 initiates the key operation-based start-up process (Step S3). The driver for the starter relay 503 is configured as a self-holding circuit which is operable, when an electromotive force is generated at the starter activation contact for a given time, to close the circuit so as to close the starter relay 503 for the starter motor 27a, as mentioned above. This allows electric power to be supplied from the starter battery 520 to the starter motor 27a. Then, the starter control section 122 sends a control signal D to the starter unit 27, so that the starter motor 27a is driven, and the pinion gear 27b is brought into mesh engagement with the ring gear 28 located on a forward side thereof to transmit a torque of the starter motor 27a so as to drivingly rotate the crankshaft 11.

In the key operation-based start-up process for the engine 10, the ignition key switch SW1 is then operated such that the input contact is connected to the output contact. Then, the main relay 501 is closed to allow electric power to be supplied from the general-purpose battery 510 to each of the in-vehicle electric loads under control of the powertrain control module 100 and other control modules 200 to 400.

In this state, the combustion control section 120 adequately sets respective values of the throttle opening (intake-air volume) TVO, the fuel injection amount $Q_{FL}$ (and the fuel injection timing $T_{FL}$) and the ignition timing $T_{IG}$ of the engine 10, based on the respective output signals $SN_{AL\,\theta}$, $SN_{11}$, $SN_{12}$, $SN_{CAM\,\theta}$, $SN_{ENT}$, $SN_{AF}$, $SN_{INP}$ from the accelerator-pedal angular position sensor SN4, the crank angle sensor SN7, the cam phase sensor SN8, the coolant temperature sensor SN9, the airflow sensor SN10 and the intake pressure sensor SN11, and outputs respective control signals $D_{TVO}$, $D_{FL\_Q}$, $D_{IG}$ of the throttle opening TVO, the fuel injection amount $Q_{FL}$ (fuel injection timing $T_{FL}$) and the ignition timing $T_{IG}$ to each of the fuel injection valves 21, the throttle valves 40 (actuator 41 thereof) and each of the ignition devices 20, respectively. Thus, the engine 10 is started up with the assistance of a driving force of the starter motor 27a.

Then, each of the modules 100 to 400 executes a normal-running control routine for controlling the associated unit(s) according to a predetermined program, while monitoring respective outputs of the sensors SN1 to SN55 and respective open/close states of the switches SW1 to SW201 (Step S4). After the start-up of the engine 10, the pinion gear 27b of the starter motor 27a is disengaged from the ring gear 28, and then the relay control section 124 operates to open the starter relay 503 so as to stop the starter unit 27.

After the start-up of the engine 10, the stop/restart condition determination section 111 of the powertrain control module 100 firstly reads the automatic stop prohibition flag $F_{IS\_PRO}$ to check whether the value thereof is 0 (Step S5). If the automatic stop prohibition flag $F_{IS\_PRO}$ is 1 (NO in Step S5), the powertrain control module 100 controls the engine 10 without performing the determination on the satisfaction or non-satisfaction of the automatic stop condition, because the value 1 means that the post-attached load 601 has already been detected. That is, when the automatic stop prohibition flag $F_{IS\_PRO}$ is 1, the execution of the automatic stop control process will be prohibited until the ignition key switch SW1 is manually operated to connect the input contact to the OFF contact, i.e., turned off.

If the automatic stop prohibition flag $F_{IS\_PRO}$ is 0 (YES in Step S5), the stop/restart condition determination section 111 of the powertrain control module 100 determines the satisfaction or non-satisfaction of the automatic stop condition. If it is determined that the automatic stop condition is not satisfied, the routine returns to Step S4 to continue the normal-running control routine for the engine 10. Differently, when the automatic stop condition is satisfied, the battery-state determination section 112 detects a state of the starter battery 520. Specifically, the battery-state determination section 112 executes a running-state current-value diagnosis step of detecting the current $I_{EBAT}$ flowing out of the starter battery 520, and comparing an absolute value of the detected current $I_{EBAT}$ with a given current value $I_{EBAT\_TH}$ (Step S7). If the absolute value of the detected current $I_{EBAT}$ is equal to or less than the current value $I_{EBAT\_TH}$ as a threshold value (YES in Step S7), the battery-state determination section 112 further reads the determination flag $F_{IS\_V}$ to check a change in voltage value of the starter battery 520 (Step S8). If the determination flag $F_{IS\_V}$ is 1, the battery-state determination section 112 executes an after-mentioned detection-value stabilization processing subroutine (Step S9). After completion of the after-mentioned detection-value stabilization processing subroutine, or when the determination flag $F_{IS\_V}$ is 0, the battery-state determination section 112 executes a running-state voltage-value diagnosis step of comparing an absolute value of an amount of change in the voltage $V_{EBAT}$ of the starter battery 520 (i.e., an absolute value of a difference between an initial voltage value $V_{EBAT\_S}$ as a reference value, and a present voltage value $V_{EBAT}$), with a given voltage value $V_{EBAT\_TH}$ as a threshold value (Step S10). If the absolute value of the amount of change in the voltage $V_{EBAT}$ is equal to or less than the voltage value $V_{EBAT\_TH}$ (YES in Step S10), the powertrain control module 100 executes the automatic stop control process (Step S11), and then updates the automatically stopped state flag $F_{IS}$ to 1 (Step S12).

If the absolute value of the current $I_{EBAT}$ flowing out of the starter battery 520 is greater than the current value $I_{EBAT\_TH}$ in Step S7, or the absolute value of the amount of change in (differential value of) the voltage $V_{EBAT}$ of the starter battery 520 is greater than the voltage value $V_{EBAT\_TH}$ as a threshold value in Step S10, the battery-state determination section 112 updates the automatic stop prohibition flag $F_{IS\_PRO}$ to 1 (Step S14) to prohibit the execution of the automatic stop control process for the engine 10. Then, based on the state of the ignition key switch SW1 (Step S15), the processing in Step S4 and subsequent Steps will be repeated until the ignition key switch SW1 is turned off.

As above, in the first embodiment, a redundant control scheme is employed which is configured to execute both the running-state current-value diagnosis step of detecting the current $I_{EBAT}$ flowing out of the starter battery 520, and comparing an absolute value of the detected current $I_{EBAT}$ with the given current value $I_{EBAT\_TH}$ (Step S7), and the running-state voltage-value diagnosis step of comparing an absolute value of an amount of change in the voltage $V_{EBAT}$ of the starter battery 520 (i.e., an absolute value of a difference between an initial voltage value $V_{EBAT\_S}$ as a reference value, and a present voltage value $V_{EBAT}$), with the given voltage value $V_{EBAT\_TH}$ as a threshold value (Step S10). Thus, even if a false detection (e.g., failure of the current sensor SN52 or the voltage sensor SN54) occurs in any of the diagnosis steps, the above scheme provides a fail-safe function. Further, the execution of the automatic stop control process for the engine 10 is prohibited in a running state susceptible to the connection of the post-attached load 601, to prevent the engine 10 in the automatically stopped state from falling into an unrestartable state.

Then, when the automatic stop control process is executed in Step S11, the powertrain control module 100 firstly operates to stop fuel injection into each of the cylinders 15A to 15D at a given timing (i.e., performs a fuel-cut operation) to automatically stop the engine 10, while executing various controls to allow the pistons 16 to be stopped at a position falling within an adequate range, in an automatically stopped state of the engine 10.

The reason for stopping the piston 16 at a position falling within the adequate range is to successfully execute a combustion-based restart process in the subsequent automatic restart control process. For example, in a compression-stroke cylinder being on a compression stroke in the automatically stopped state of the engine 10 (stopped-state compression-stroke cylinder), the adequate range is in the range of 80 to 60 CA degrees before top dead center (BTDC). In an expansion-stroke cylinder being on an expansion stroke in the automatically stopped state of the engine 10 (stopped-state expansion-stroke cylinder), the adequate range is in the range of 100 to 120 CA degrees after top dead center (ATDC).

During a course of automatically stopping the engine 10, the automatic stop control section 121 of the powertrain control module 100 executes a throttle valve control process and an alternator control process to allow the piston 16 to be stopped at a position falling within the adequate range. The throttle valve control process is intended to controlling the throttle valve 40 to adjust an amount of intake air to be supplied to each of the cylinders 15A to 15D before the engine 10 is completely stopped. Specifically, an opening degree of the throttle valve 40 is set at a relatively large value at a timing of the stop of the fuel injection to promote scavenging so as to supply a large amount of flesh air into each of the stopped-state expansion-stroke cylinder and the stopped-state compression-stroke cylinder. Then, at a timing when a generous amount of flesh air is supplied into each of the stopped-state expansion-stroke cylinder and the stopped-state compression-stroke cylinder, the opening degree of the throttle valve 40 is reduced.

Further, during the course of the automatic stop control process for the engine 10, the transmission control module 200 9 instructs the transmission pump driver 224 to drive the electric oil pump 223 in the normal mode. Thus, even if the engine speed Ne (=a rotor speed of the mechanical oil pump 222) is lowered due to the stop of the fuel supply, an oil pressure is supplied from the electric oil pump 223 to the transmission 201. This makes it possible to maintain and continue an operation (e.g., engagement of the hydraulic clutches) of the hydraulic mechanism 221 of the transmission 201.

In parallel with the throttle valve control process, the powertrain control module 100 continues the alternator control process to continuously adjust a stop position of the piston 16 while checking whether the engine 10 is completely stopped, based on the output signals $SN_{11}$, $SN_{12}$ of the crank angle sensor SN7. When the engine 10 is completely stopped, the alternator control process is terminated, and the stop position of the piston 16 detected by the crank angle sensor SN7 is stored in the memory.

Even after the engine 10 is automatically stopped, the powertrain control module 100 operates to continuously supply electric power to specific electric loads requiring electric power supply even in the stopped state of the engine 10, such as the dynamic stability control system 230 (hill holder unit 240 incorporated therein). For this purpose, the main relay 510 is kept in a closed position until the ignition switch SW1 is turned off. Thus, electric power is continuously supplied from the general-purpose battery 510 to the specific electric loads.

FIG. 6 is a flowchart showing the automatic restart control process in the internal combustion engine system according to the first embodiment.

Referring to FIG. 6, after the engine 10 is automatically stopped, the powertrain control module 100 executes diagnosis (inspection) of the starter battery 520 at a given timing in the same manner as described above, while monitoring the satisfaction or non-satisfaction of the restart condition, to perform detection of the post-attached load 601.

Specifically, the stop/restart condition determination section 111 determines the satisfaction or non-satisfaction of the restart condition for initiating the combustion-based restart process (i.e., combustion-based restart condition) (Step S20).

If the combustion-based restart condition is satisfied, the combustion control section 120 operates to perform first fuel injection in the stopped-state compression-stroke cylinder (e.g., cylinder 15C; the following description will be made on an assumption that the stopped-state compression-stroke cylinder is the cylinder 15C. Thus, the stopped-state expansion-stroke cylinder is the cylinder 15A, and a stopped-state intake-stroke cylinder being on an intake stroke in the automatically stopped state of the engine 10 is the cylinder 15D), and ignite a resulting air-fuel mixture to produce combustion. Thus, the piston 16 of the stopped-state compression-stroke cylinder 15C is pushed downwardly toward bottom dead center (BDC) by a resulting combustion pressure, and thereby the engine 10 is rotated in a direction reverse to a normal rotation direction. In conjunction with the reverse rotation of the engine 10, the stopped-state expansion-stroke cylinder 15A is moved toward top dead center (TDC). Then, at a timing when the piston 16 of the stopped-state expansion-stroke cylinder 15A is moved on the side of TDC (preferably, to a position slightly closer to TDC relative to a midpoint of the expansion stroke) to compress air in the stopped-state expansion-stroke cylinder 15A, fuel is injected into the stopped-state expansion-stroke cylinder 15A. Thus, based on a latent heat of vaporization of the injected fuel, a compression pressure in the stopped-state expansion-stroke cylinder 15A is lowered to allow the piston 16 to be moved closer to TDC, so that a density of compressed air (air-fuel mixture) is increased. At a timing when the piston 16 of the stopped-state expansion-stroke cylinder 15A is moved to a position fairly close to TDC, the ignition device 20 of the cylinder 15A is activated to produce combustion of the injected fuel, and a resulting combustion pressure allows the engine 10 to be rotated in the normal rotation direction.

Further, at an appropriate timing, fuel is injected into the stopped-state compression-stroke cylinder 15C to form an air-fuel mixture richer than a combustible air fuel ratio. Although the air-fuel mixture is not used for combustion tin he stopped-state compression-stroke cylinder 15C, a latent heat of vaporization of the injected fuel can lower a compression pressure in the cylinder 15C to reduce combustion energy which is to be generated from first combustion in the stopped-state expansion-stroke cylinder 15A and to be consumed to allow the stopped-state compression-stroke cylinder 15C to pass beyond the TDC of the compression stroke (i.e., compression TDC which firstly occurs after initiation of the automatic restart control process: first TDC).

After the stopped-state compression-stroke cylinder 15C passes beyond the compression TDC (first TDC), the stopped-state intake-stroke cylinder 15D has a compression stroke. That is, next combustion is produced in the stopped-state intake-stroke cylinder 15SD.

The combustion control section 120 of the powertrain control module 100 operates to inject fuel into the stopped-state intake-stroke cylinder 15D at a timing (e.g., an intermediate stage of the compression stroke) suitable for lowering an in-cylinder temperature and a compression pressure by a latent heat of vaporization of the injected fuel so as to prevent occurrence of self-ignition at a timing before the compression TDC in the compression stroke of the stopped-state intake-stroke cylinder 15D. Further, an ignition timing for the stopped-state intake-stroke cylinder 15D is set a point after the TDC of the compression stroke to prevent combustion from being produced at a timing before the compression TDC. That is, the lowering of the compression pressure based on the fuel injection and the prevention of combustion before the compression TDC make it possible to reduce energy to be generated from the first combustion in the stopped-state expansion-stroke cylinder 15A and to be consumed to allow the stopped-state intake-stroke cylinder 15D to pass beyond the compression TDC (i.e., compression TDC which secondly occurs after initiation of the automatic restart control process: second TDC).

In the above manner, the energy generated from the first combustion in the stopped-state expansion-stroke cylinder 15A allows the stopped-state compression-stroke cylinder 15C and the stopped-state intake-stroke cylinder 15D to pass beyond the first compression TDC (first TDC) and the second compression TDC (second TDC), respectively. This makes it possible to ensure smooth and reliable startability.

In the combustion-based restart process, a critical factor determining the success or failure of restart is whether or not the stopped-state intake-stroke cylinder 15D can successfully pass beyond the second TDC. Specifically, the piston 16 is not always stopped at a position falling within the adequate range depending on characteristics of the engine 10, and thereby there is a possibility to fail to restart the engine 10 based on the combustion-based restart process. As measures against this risk, in the first embodiment, the necessity of restart using the starter unit 27 is determined (Step S22), and, if it is determined that the starter unit 27 is necessary for restart, a starter-based start-up process is executed (Step S23).

Specifically, in response to detection of failure of restart based on the combustion-based restart process, the starter unit 27 is immediately activated to reliably start up the engine 10 (starter backup). In the starter-based start-up process, the power relay 502 is kept in an open position, and only the starter relay 503 is closed to connect the starter battery 520 to the starter unit 27. Thus, electric current is supplied only from the starter battery 520 to the starter unit 27. This makes it possible to continuously supply electric power from the general-purpose battery 510 to the electric loads requiring electric power supply even in the stopped state of the engine 10, such as the dynamic stability control system 230 (hill holder unit 240 incorporated therein), under control of the powertrain control module 100, and ensure a stable operation of the hill holder unit 240 and others even in a situation where the engine 10 cannot be started up only by the combustion-based restart process, due to misfire or the like.

Then, the running-state determination section 110 determines whether the engine speed Ne of the engine 10 reaches a given engine speed $Ne_{START}$ (Step S24).

If the engine speed Ne of the engine 10 reaches the given engine speed $Ne_{START}$, the relay control section 124 determines whether the starter relay 503 is in the closed position (Step S25). If the starter relay 503 is in the closed position, the relay control section 124 operates to open the starter relay 503 (Step S26), and initialize the associated flags $F_{IS}$, $F_{IS\_V}$ (Step S27). Then, the routine returns to Step S4 to execute the normal-running control routine.

In Step S24, if it is determined that the engine speed Ne of the engine 10 does not reach the given engine speed $Ne_{START}$, the start-up of the engine is likely to be hindered for some reason. For example, as shown in Step S23 in FIG. 6, electric power for driving the starter unit 27 is normally supplied from the starter battery 520. Further, if a charged state of the starter battery 520 is insufficient, the power relay 502 is closed to additionally supply electric power from the general-purpose battery 510 to the starter unit 27. However, if a charged state of the general-purpose battery 510 is also insufficient, it is likely that the starter unit 27 is not adequately driven, and thereby the engine 10 is not started up, although it is a rare case. In the first embodiment, an engine-stall processing condition, i.e., a state to be determined as engine stall (e.g., the number of times of misfire, a threshold value of an amount of excess electric power in the general-purpose battery 510, or the number of times of release of the restart condition) is pre-set to allow the running-state determination section 110 to determine the satisfaction or non-satisfaction of the engine-stall processing condition (Step S28).

When the running-state determination section 110 determines that the engine-stall processing condition is satisfied, the abnormality processing section 125 of the powertrain control module 100 executes the aforementioned engine-stall processing (Step S29), and then the automatic restart control process is terminated. The engine-stall processing is executed in the same manner as that to be executed when engine stall occurs during normal running of the engine 10. This allows a driver to recognize that a usual state in which an engine cannot be started up due to run-out of a battery, without strange feeling. That is, the engine-stall processing makes it possible to avoid occurrence of an undesirable situation where, although a battery runs out, a driver waits confidently for automatic restart without recognizing the run-out of the battery, and feels strange or complains about poor startability due to no restart after long wait.

In Step S28, when the running-state determination section 110 determines that the engine-stall processing condition is not satisfied, the routine returns to Step S24 to check whether the engine 10 is restarted.

In Step S20 in FIG. 6, if the combustion-based restart condition is not satisfied, the battery-state determination section 112 detects the state of the starter battery 520. Specifically, the battery-state determination section 112 executes an automatically stopped-state current-value diagnosis step of detecting the current $I_{EBAT}$ flowing out of the starter battery 520, and comparing an absolute value of the detected current $I_{EBAT}$ with the given current value $I_{EBAT\_TH}$ as a threshold value (Step S30). If the absolute value of the current $I_{EBAT}$ is equal to or less than the current value $I_{EBAT\_TH}$ as a threshold value (YES in Step S30), the battery-state determination section 112 further reads the determination flag $F_{IS\_V}$ to check a change in voltage value of the starter battery 520 (Step S31). If the determination flag $F_{IS\_V}$ is 1, the battery-state determination section 112 executes an after-mentioned detection-value stabilization processing subroutine (Step S32). After completion of the after-mentioned detection-value stabilization processing subroutine, or when the determination flag $F_{IS\_V}$ is 0, the battery-state determination section 112 executes an automatically stopped-state voltage-value diagnosis step of comparing an absolute value of an amount of change in the voltage $V_{EBAT}$ of the starter battery 520 (i.e., an absolute value of a difference between an initial voltage value $V_{EBAT\_S}$ as a reference value, and a present voltage value $V_{EBAT}$), with the given voltage value $V_{EBAT\_TH}$ as a threshold value (Step S33). If the absolute value of the amount of change in the voltage $V_{EBAT}$ is equal to or less than the voltage value $V_{EBAT\_TH}$ (YES in Step S33), the stop/restart condition determination section 111 of the powertrain control module 100 determines the satisfaction or non-satisfaction of the restart condition for the aforementioned starter-based automatic restart process (starter-based automatic restart condition) (Step S34).

If the starter-based automatic restart condition is satisfied, the routine returns to Step 24. Subsequently, the same control as that in the aforementioned starter-assisted start-up process is executed to restart the engine 10. In the starter-based automatic restart process, the engine 10 is initially rotated in the normal rotation direction without rotating the engine 10 in the reverse rotation direction. Specifically, combustion is produced in the stopped-state expansion-stroke cylinder 15A, while giving a driving force from the starter unit 27 to the engine 10, to reliably restart the engine 10.

In Step S34, if it is determined that the starter-based automatic restart condition is not satisfied, the routine returns to Step S20.

If the absolute value of the current $I_{EBAT}$ flowing out of the starter battery 520 is greater than the current value $I_{EBAT\_TH}$ as a threshold value in Step S30, or the absolute value of the amount of change in (differential value of) the voltage $V_{EBAT}$ of the starter battery 520 is greater than the voltage value $V_{EBAT\_TH}$ as a threshold value in Step S33, the battery-state determination section 112 updates the automatic stop prohibition flag $F_{IS\_PRO}$ to 1 (Step S36) to prohibit the execution of the automatic stop control process for the engine 10. Then, the relay control section 124 operates to close both the power relay 502 and the starter relay 503 to drive the starter unit 27, and the combustion control section 120 initiates the execution the combustion-based restart process for the engine 10 (Step S35). That is, if the connection of the post-attached load 601 is detected in the automatically stopped state of the engine 10, the engine 10 is forcibly restarted irrespective of the satisfaction or non-satisfaction of the restart condition, and the automatic stop prohibition flag $F_{IS\_PRO}$ is set to 1 to prohibit a subsequent execution of the automatic stop control process for the engine 10 until the ignition switch SW1 is turned off.

In order to the above forcible restart of the engine 10, in the first embodiment, a redundant control scheme is employed which is configured to execute both the automatically stopped-state current-value diagnosis step of detecting the current $I_{EBAT}$ flowing out of the starter battery 520, and comparing an absolute value of the detected current $I_{EBAT}$ with the given current value $I_{EBAT\_TH}$ (Step S30), and the automatically stopped-state voltage-value diagnosis step of comparing an absolute value of an amount of change in the voltage $V_{EBAT}$ of the starter battery 520 (i.e., an absolute value of a difference between an initial voltage value $V_{EBAT\_S}$ as a reference value, and a present voltage value $V_{EBAT}$), with the given voltage value $V_{EBAT\_TH}$ as a threshold value (Step S33). Thus, even if a false detection (e.g., failure of the current sensor SN52 or the voltage sensor SN54) occurs in any of the diagnosis steps, the above scheme provides a fail-safe function. Further, the execution of the automatic stop control process for the engine 10 is prohibited in a running state susceptible to the connection of the post-attached load 601, to prevent the engine 10 in the automatically stopped state from falling into an unrestartable state.

Figure 7A:
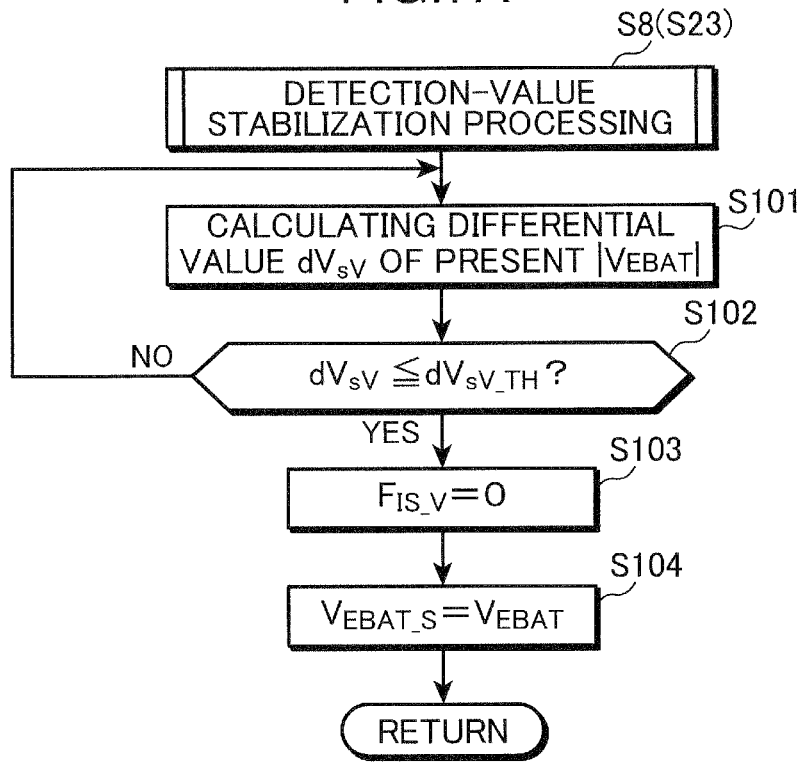
Figure 7B:
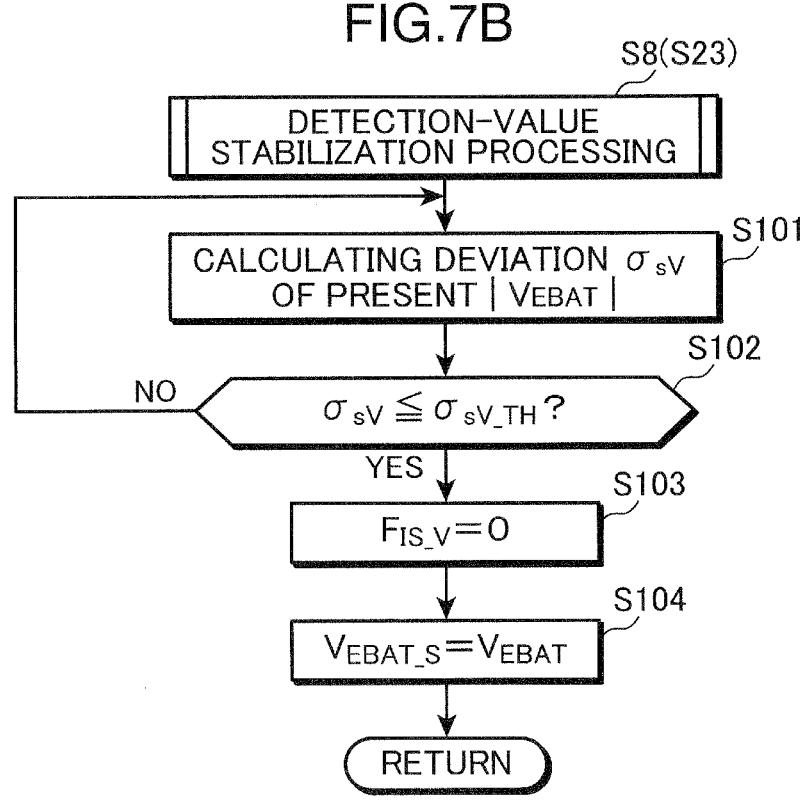

FIGS. 7A and 7B show specific examples of a detection-value stabilization processing subroutine in the flowcharts in FIGS. 5 and 6.

In order to stabilize a detected voltage value, a technique may be employed which is based on a change rate (differential value) derived by differentiating an absolute value of a detected present voltage value $V_{EBAT}$, as shown in FIG. 7A, or based on a deviation $s_{SV}$ of an absolute value of a detected present voltage value $V_{EBAT}$, as shown in FIG. 7B.

In the example illustrated in FIG. 7A, an absolute value of a detected present voltage value $V_{EBAT}$ is subjected to differential operation to obtain a change rate (differential value) $dV_{SV}$ (Step S101), and then the differential value $dV_{SV}$ is compared with a given threshold $dV_{SV\_TH}$ (Step S102). If the differential value $dV_{SV}$ is greater than the threshold $dV_{SV\_TH}$, it is determined that the detected voltage value is largely varied, i.e., unstable, (NO in Step S102), and the subroutine returns to Step S101 to update the differential value $dV_{SV}$. If the differential value $dV_{SV}$ is equal to or less than the threshold $dV_{SV\_TH}$, the determination flag $F_{IS\_V}$ is updated to 0 (Step S103), and the initial voltage value $V_{EBAT\_S}$ (reference value) of a target (starter battery 520) is updated to a latest voltage value $V_{EBAT}$ (Step S104). Thus, a voltage value stabilized by the detection-value stabilization processing subroutine in FIG. 5 or FIG. 6 can be used for detection of the post-attached load 601 post-attached to the starter battery 520, to provide enhanced detection accuracy.

In the example illustrated in FIG. 7B, a deviation $s_{SV}$ of an absolute value of a detected present voltage value $V_{EBAT}$ is calculated (Step S101), and then compared with a given threshold $s_{SV\_TH}$ (Step S102). If the deviation $s_{SV}$ is greater than the threshold $s_{SV\_TH}$, it is determined that the detected voltage value is largely varied, i.e., unstable, (NO in Step S102), and the subroutine returns to Step S101 to update the deviation $s_{SV}$. If the deviation $s_{SV}$ is equal to or less than the threshold $s_{SV\_TH}$, the determination flag $F_{IS\_V}$ is updated to 0 (Step S103), and the initial voltage value $V_{EBAT\_S}$ (reference value) of a target (starter battery 520) is updated to a latest voltage value $V_{EBAT}$ (Step S104). Thus, a voltage value stabilized by the detection-value stabilization processing subroutine in FIG. 5 or FIG. 6 can be used for detection of the post-attached load 601 post-attached to the starter battery 520, to provide enhanced detection accuracy.

Second Embodiment

An internal combustion engine system according to a second embodiment of the present invention will be described below.

Figure 8:
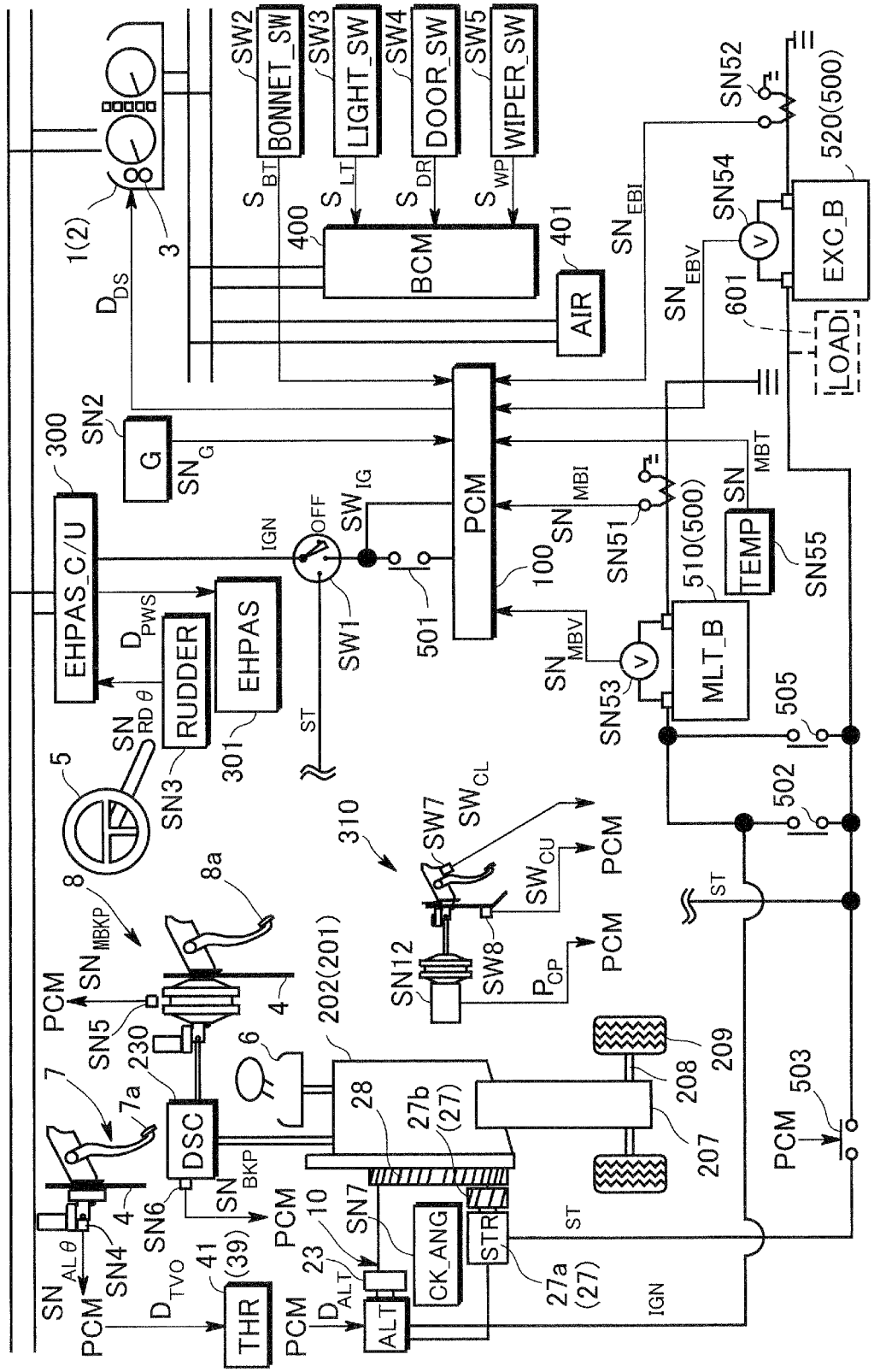
FIG. 8 is a schematic block diagram showing an internal combustion engine system according to a second embodiment of the present invention.
Figure 9:
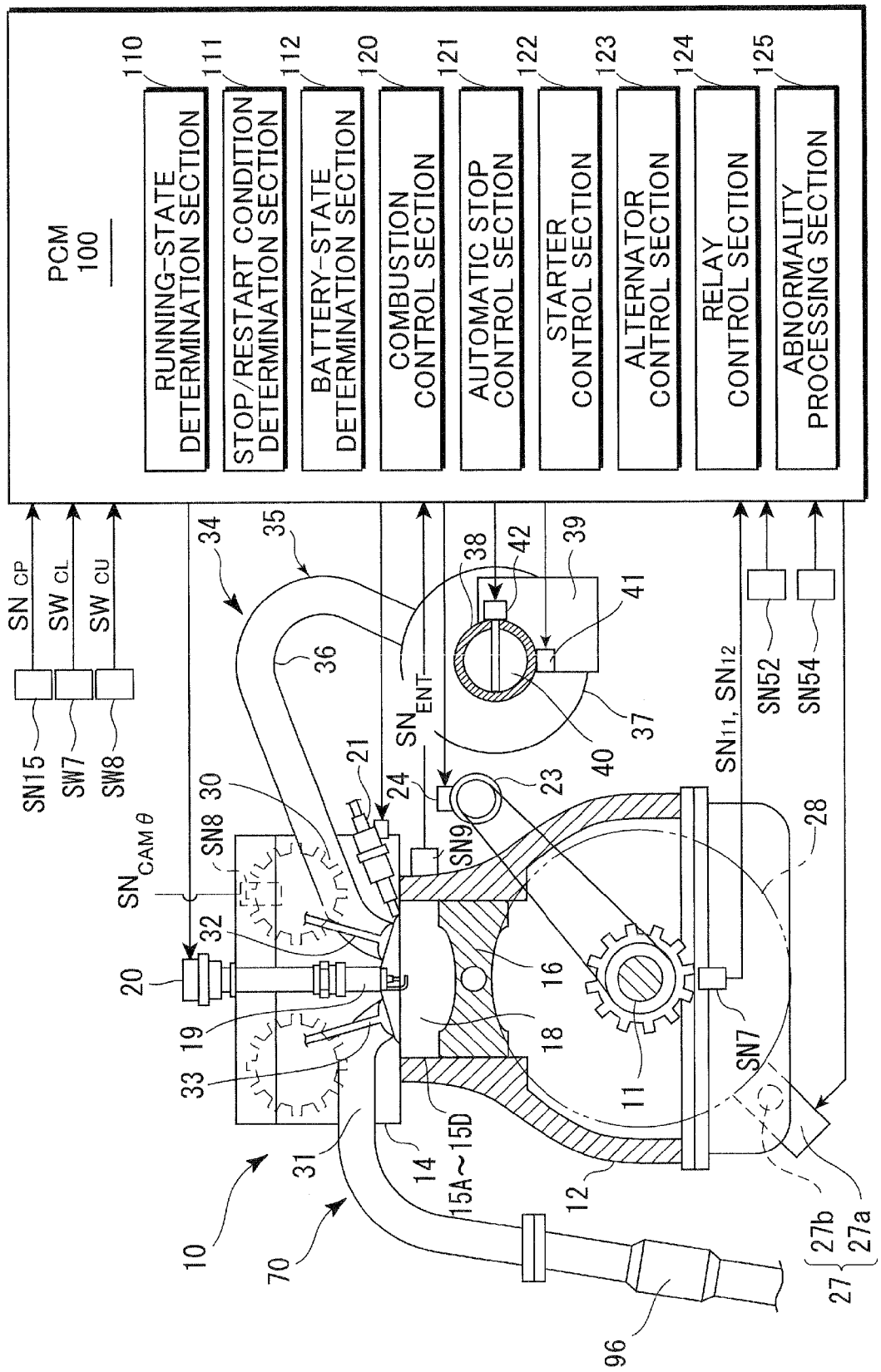
FIG. 9 is a schematic block diagram primarily showing an engine in section, in the internal combustion engine system according to the second embodiment.

FIG. 8 is a schematic block diagram showing the internal combustion engine system according to the second embodiment, and FIG. 9 is a schematic block diagram primarily showing an engine in section, in the internal combustion engine system according to the second embodiment.

Referring to FIGS. 8 and 9, in the second embodiment, a powertrain mounted on a vehicle includes a transmission 201 embodied as a manual transmission, and a passenger compartment of the vehicle is equipped with a clutch pedal 311 of a clutch pedal unit 310 for selectively engaging and disengaging a clutch 204 included in the manual transmission 204.

FIG. 10 is a schematic block diagram showing respective structures of the manual transmission 201 and the clutch pedal unit 310.

Referring to FIGS. 8 and 10, the manual transmission 201 comprises a clutch 204 and a gear train 205 which are arranged in a gear box 202 coupled to an engine 10. The clutch 204 is designed to selectively connect and disconnect a crankshaft of the engine 10 to/from an input shaft 203 of the gear train 205, wherein the clutch 204 is engaged to allow engine power to be transmitted from the crankshaft 11 to the input shaft 203, and disengaged to cut off the power transmission. The gear train 205 is designed to output engine power from the input shaft 203 to an output shaft 206 while selectively increase and reduce a speed, and selectively reverse a rotation direction, based on a gear ratio selected from a plurality of speed stages (gear positions) (e.g., six forward stages and one reverse stage). When a neutral stage (neutral position) is selected, none of the speed stages is effected, so that, even if the clutch 204 is engaged, no engine power is transmitted from the input shaft 203 to the output shaft 206. In this specification, the speed stages (gear positions) other than the neutral stage (neutral position) will be referred to as "drive stage (drive position)").

A link mechanism 225 is designed to change between the gear positions in the gear train 205, and adapted to be moved in conjunction with the shift lever 6. Under a condition that the clutch 204 is disengaged, a driver can manually operate the shift lever 6 to change between the gear positions.

A gear position switch SW201 is installed in a vicinity of the link mechanism 225. The gear position switch SW201 is designed to detect a selected one of the gear position. The gear position switch SW201 is operable to detect whether the selected gear position is the neutral position or the drive position. Alternatively, the gear position switch SW201 may be designed to detect whether the selected gear position is the drive position, or which of the gear positions the selected drive position is, or whether the selected gear position is the reverse position.

The clutch pedal unit 310 is a mechanism for allowing a driver to selectively engage and disengage the clutch 204 by his/her foot, and installed in a vicinity of the foot of the driver seated in a driver seat. The clutch pedal unit 310 is designed to operate the clutch 204 according to the foot operation of the clutch pedal 311. In the illustrated example, the clutch pedal unit 310 includes a pedal bracket 312 fixed to a lower dash panel 4, a support shaft 313 allowing the an upper end of the clutch pedal 311 to be pivotally supported by the pedal bracket 312 in a cantilevered manner, and a master cylinder 314 adapted to be moved by the clutch pedal 311.

The clutch pedal 311 has a pedal pad 315 integrally formed at a free end thereof to receive a depressing force of a driver. A spring mechanism 316 is provided between the pedal bracket 312 and a central portion of the clutch pedal 311 to bias the clutch pedal 311 in a counterclockwise direction in FIG. 10. Further, a rod 318 of the master cylinder 314 is connected to the clutch pedal 311 through a pin 317. Thus, a rotational movement of the clutch pedal 311 input from the pedal pad 315 by a driver is converted into a reciprocating movement and transmitted to the master cylinder 314, and the clutch 204 is disengaged by an oil pressure proportional to an amount of depression of the clutch pedal 311.

The master cylinder 314 is provided with a clutch stroke sensor SN15 to detect a state of depression of the clutch pedal 311. In the illustrated example, the clutch stroke sensor SN15 is operable to detect an amount of displacement of the rod 318 of the master cylinder 314 to detect an amount of depression of the clutch pedal 311. The pedal bracket 312 is provided with two stoppers 319, 320 to restrict a clutch stroke CP of the clutch pedal 311. The stopper 319 is provided with a clutch switch SW7 adapted to be turned on when the clutch pedal 311 is moved apart from the stopper 319, and the stopper 320 is provided with a clutch cut switch SW8 adapted to be turned on when the clutch pedal 311 is brought into contact with the stopper 320. The switches SW7, SW8 are installed at positions corresponding to an initial end and a terminal end of the clutch stroke CP along which the clutch pedal 311 is swingably moved.

Thus, when the clutch pedal 311 is in a free state (in contact with the stopper 319) without a depression operation of a driver, i.e., when the clutch pedal 311 pulls the rod 318 of the master cylinder 314 most toward a passenger compartment by the spring mechanism 316, both the clutch switch SW7 and the clutch cut switch SW8 are turned off. When the driver maximally depresses the pedal pad 315 and thereby the clutch pedal 311 is brought into contact with the stopper 320, i.e., the rod 318 of the master cylinder 314 is pressed most toward an engine compartment, both the clutch switch SW7 and the clutch cut switch SW8 are turned on. Further, when the driver depresses the pedal pad 315 to an approximately intermediate position of the clutch stroke CP, and the clutch pedal 311 is brought into contact with neither the stopper 319 nor the stopper 320, the clutch switch SW7 is turned on, and the clutch cut switch SW8 is turned off.

Referring to FIG. 9, in the second embodiment, a stop/restart condition determination section 111 of a powertrain control module 100 further has a function of detecting a power transmission state of the transmission 201 based on respective signals $SW_{GR}$, $SN_{CP}$, $SW_{CL}$, $SW_{CU}$ output from the gear position switch 201, the clutch stroke sensor SN15, the clutch switch SW7 and the clutch cut switch SW8. Based on the signals $SN_{CP}$, $SW_{CL}$, $SW_{CU}$ output from the clutch stroke sensor SN15, the clutch switch SW7 and the clutch cut switch SW8, it is determined whether the clutch 204 is in an engaged state or in a disengaged state. For example, when both the clutch switch SW7 and the clutch cut switch SW8 is turned off (the clutch pedal 311 is not operated by the driver), it is determined that the clutch 204 is in the engaged state. Further, when both the clutch switch SW7 and the clutch cut switch SW8 is turned on (the clutch pedal 311 is maximally depressed by the driver), it is determined that the clutch 204 is in the disengaged state, When the clutch pedal 311 is at the intermediate position of the clutch stroke CP, a previous determination may be maintained. Alternatively, in order to perform the determination with a higher degree of accuracy, a boundary position for distinguishing between the engaged and disengaged states may be set at a position corresponding to a clutch meet point, to determine whether the clutch 204 is in an engaged state or in a disengaged state, based on the output signal $SN_{CP}$ of the clutch stroke sensor SN15.

Further, based on the output signals $SW_{GR}$ of the gear position switch 201, it is determined whether the gear train 205 is in the neutral position or in the drive position. When the clutch 204 is in the engaged state, and the gear train 205 is in the drive position, the running-state determination section 110 determines that the manual transmission 201 is in a power transmission state. In other condition, i.e., when he clutch 204 is in the disengaged state, or the gear train 205 is in the neutral position, the running-state determination section 110 determines that the manual transmission 201 is in a non-power transmission state. This determination result is used for the automatic restart control process in the automatic stop/restart control scheme, as will be described later.

In the second embodiment, the stop/restart condition determination section 111 is operable to determine that an automatic stop condition is satisfied when all the following states are detected: a state when the clutch 204 is in the engaged state (the clutch pedal unit 10 is in a free state, and the clutch switch SW7 is in an OFF state), a state when the transmission 201 is in a neutral position, a state when a vehicle speed is equal to or less than a given value, and a state when a coolant temperature is a given temperature (e.g., 80° C.) or more. Further, the stop/restart condition determination section 111 is operable to determine that a restart condition is satisfied when at least one the above states is not detected, e.g., when the clutch 204 is disengaged (the clutch pedal unit 10 is depressed, and the clutch switch SW7 is turned on), after satisfaction of the automatic stop condition. In the determination on whether the clutch 204 is in the engaged state or in the disengaged state, the clutch meet point detected using the clutch stroke sensor SN15 may be used as the boundary position for distinguishing between the engaged and disengaged states, as described above. However, in the internal combustion engine system employing the manual transmission 201, when the transmission 201 is in the neutral position, driver's intention to restart a vehicle cannot be determined. Thus, differently from the first embodiment in which the restart condition includes a state when the gear train is in the neutral position, the restart condition in the second embodiment excludes the state when the gear train is in the neutral position.

In the internal combustion engine system using the above manual transmission, the automatic stop/restart control scheme described in connection with FIGS. 5 to 7 may be employed.

As mentioned above, the internal combustion engine systems according to the first and second embodiments include the following technical concepts.

A control method for the internal combustion engine system which includes the engine 10, the starter unit 27 adapted to start up the engine 10, and the starter battery 520 for use as an electric power source at least for activating the starter unit 27, comprises: an automatic stop step (Step S11) of, upon satisfaction of a given automatic stop condition, automatically stopping the engine 10 being running; a restart step (Step S23) of, upon satisfaction of a given restart condition after the engine 10 is automatically stopped, supplying electric power from the starter battery 27 to the starter unit 27 to automatically restart the engine 10; a stopped-state current-value diagnosis step (Step S30) of comparing a value of current flowing out of the starter battery 27 with a predetermined current value, in the automatically stopped state of the engine 10; and a forcible restart step (Step S35) of, when a result of the stopped-state current-value diagnosis step indicates that the value of current flowing out of the starter battery 27 is greater than the predetermined current value, restarting the engine 10 irrespective of the satisfaction or non-satisfaction of the restart condition.

In cases where a user post-attaches an electric load, e.g., an accessory component, such as a lamp, an amount of electric power stored in the starter battery 520 is likely to reduce in a stopped state of the engine 10. In the control method according to the above embodiments, it is detected whether the value of current flowing out of the starter battery 27 is greater than the predetermined current value, in the automatically stopped state of the engine 10. Then, when the value of current flowing out of the starter battery 27 is greater than the predetermined current value, the engine 10 is restarted irrespective of the satisfaction or non-satisfaction of the restart condition. This makes it possible to prevent the automatically stopped engine 10 from falling into an unrestartable state.

The control method in the above embodiments comprises a running-state current-value diagnosis step (Step S7) of comparing a value of current flowing out of the starter battery 520 with the predetermined current value, upon the satisfaction of the automatic stop condition, and an automatic-stop prohibition step (Step S11) of, when a result of the running-state current-value diagnosis step indicates that the value of current flowing out of the starter battery is greater than the predetermined current value, prohibiting the automatic stop step (Step S11) irrespective of the satisfaction or non-satisfaction of the automatic stop condition.

According to this feature, when a current greater than the predetermined current value flows out of the starter battery 520, upon the satisfaction of the automatic stop condition during running of the engine 10, i.e., the amount of electric power stored in the starter battery 520 is likely to reduce in the stopped state of the engine 10 due to an electric load, e.g., an accessory component, such as a lamp, post-attached by a user, the execution of the automatic stop control process for the engine 10 is prohibited irrespective of the satisfaction or non-satisfaction of the automatic stop condition. This makes it possible to more reliably prevent the automatically stopped engine 10 from falling into an unrestartable state.

The control method in the above embodiments further comprises a stopped-state voltage-change diagnosis step (Steps S31 to S33) of comparing a change in voltage value of the starter battery 520 with a predetermined threshold value, in the automatically stopped state of the engine 10, wherein the forcible restart step (Step S35) includes, when a result of the stopped-state voltage-change diagnosis step indicates that the change in voltage value of the starter battery 520 is greater than the predetermined threshold value, restarting the engine 10 irrespective of the satisfaction or non-satisfaction of the restart condition.

According to this feature, when the change in voltage value of the starter battery 520 is greater than the predetermined threshold value, in the automatically stopped state of the engine 10, the engine 10 is forcibly restated irrespective of the satisfaction or non-satisfaction of the restart condition. This makes it possible to more reliably prevent the automatically stopped engine 10 from falling into an unrestartable state. Further, the presence or absence of the post-attached load 601 is detected by diagnosing the current value and the change in voltage value of the starter battery 520. Thus, in cases where the current value and the voltage value are diagnosed using respective ones of the current sensor SN52 and the voltage sensor SN54, even if either one of the sensors fails, the presence or absence of the post-attached load 601 can be detected based on the other sensor. That is, a so-called fault tolerance function can also be obtained.

The control method in the above embodiments further comprises a running-state voltage-change diagnosis step (Step S8 to Step S10) of comparing a change in voltage value of the starter battery 520 with a predetermined threshold value, upon the satisfaction of the automatic stop condition, wherein the automatic-stop prohibition step includes, when a result of the running-state voltage-change diagnosis step (Step S8 to Step S10) indicates that the change in voltage value of the starter battery 520 is greater than the predetermined threshold value, prohibiting the automatic stop step (Step S11) irrespective of the satisfaction or non-satisfaction of the automatic stop condition.

According to this feature, when the change in voltage value of the starter battery 520 is greater than the predetermined threshold value, upon the satisfaction of the automatic stop condition during running of the engine 10, the execution of the automatic stop control process for the engine 10 is prohibited irrespective of the satisfaction or non-satisfaction of the automatic stop condition. This makes it possible to more reliably prevent the automatically stopped engine from falling into an unrestartable state. In addition, a fault tolerance function based on the redundant control scheme can be obtained.

The control method in the above embodiments further comprises an automatic-stop prohibition step of prohibiting the automatic stop step (Step S11) after satisfaction of a requirement for executing the forcible restart step (Step S35).

According to this feature, when the value of current flowing out of the starter battery 520 becomes greater than the predetermined current value even once, or the change in voltage value of the starter battery 520 becomes greater than the predetermined threshold, i.e., a present running state involves a risk that an amount of electric power stored in the starter battery is reduced, the execution of the automatic stop control process is prohibited to provide a fail-safe function. This makes it possible to more securely prevent the engine 10 from falling into an unrestartable state.

The internal combustion system according to each of the above embodiments includes the powertrain control module 100 operable to execute the above steps. Specifically, the powertrain control module 100 comprises the electric load adapted to be activated in a stopped state of the engine 10, and the general-purpose battery 510 for supplying electric power to the electric load, wherein the control method further comprises a stopped-state electric-power supply step of supplying electric power from the general-purpose battery 510 to the electric load, in the stopped state of the engine 10, and wherein the forcible restart step (Step S35) includes supplying electric power from both the general-purpose battery 510 and the starter battery 520 to the starter motor 27.

According to this feature, in a running condition requires the forcible restart of the engine 10, electric power is supplied from not only the starter battery 520 but also the general-purpose battery 510. Thus, even if an amount of electric power stored in the starter battery 520 is reduced at a fast pace, electric power required for restarting the engine 10 can be ensured.

In another aspect, the internal combustion engine system according to each of the above embodiments comprises the engine 10, the starter adapted to start up the engine 10, the starter battery 520 for use as an electric power source at least for activating the starter unit 27, and running control unit configured to govern a running control of the engine 10. In the internal combustion engine system, the running control unit includes: automatic stop unit operable, upon satisfaction of a given automatic stop condition, to automatically stop the engine 10 being running; restart unit operable, upon satisfaction of a given restart condition after the engine 10 is automatically stopped, to allow electric power to be supplied from the starter battery 520 to the starter unit 27 so as to automatically restart the engine 10; stopped-state current-value diagnosis unit operable to compare a value of current flowing out of the starter battery 520 with a predetermined current value, in the automatically stopped state of the engine 10; and forcible restart unit operable, when a detection result of the post-attached load detection unit indicates that the value of current flowing out of the starter battery 520 is greater than the predetermined current value, to restart the engine 10 irrespective of the satisfaction or non-satisfaction of the restart condition.

In cases where a user post-attaches an electric load, e.g., an accessory component, such as a lamp, an amount of electric power stored in the starter battery 520 is likely to reduce in a stopped state of the engine 10. In the control method according to the above embodiments, it is detected whether the value of current flowing out of the starter battery 27 is greater than the predetermined current value, in the automatically stopped state of the engine 10. Then, when the value of current flowing out of the starter battery 27 is greater than the predetermined current value, the engine 10 is restarted irrespective of the satisfaction or non-satisfaction of the restart condition. This makes it possible to prevent the automatically stopped engine 10 from falling into an unrestartable state.

The internal combustion engine system according to each of the above embodiments comprises running-state current-value diagnosis unit operable to compare a value of current flowing out of the starter battery 520 with the predetermined current value, upon the satisfaction of the automatic stop condition, and automatic-stop prohibition unit operable, when a diagnosis result of the running-state current-value diagnosis unit indicates that the value of current flowing out of the starter battery 520 is greater than the predetermined current value, to prohibit the operation of the automatic stop unit irrespective of the satisfaction or non-satisfaction of the automatic stop condition.

According to this feature, when a current greater than the predetermined current value flows out of the starter battery 520, upon the satisfaction of the automatic stop condition during running of the engine, i.e., the amount of electric power stored in the starter battery 520 is likely to reduce in the stopped state of the engine due to an electric load, e.g., an accessory component, such as a lamp, post-attached by a user, the execution of the automatic stop control process for the engine 10 is prohibited irrespective of the satisfaction or non-satisfaction of the automatic stop condition. This makes it possible to more reliably prevent the automatically stopped engine 10 from falling into an unrestartable state.

The engine internal combustion system according to each of the above embodiments comprises stopped-state voltage-change diagnosis unit operable to compare a change in voltage value of the starter battery 520 with a predetermined threshold value, in the automatically stopped state of the engine, wherein the forcible restart unit is operable, when a diagnosis result of the stopped-state voltage-change diagnosis unit indicates that the change in voltage value of the starter battery 520 is greater than the predetermined threshold value, to restart the engine 10 irrespective of the satisfaction or non-satisfaction of the restart condition.

According to this feature, when the change in voltage value of the starter battery 520 is greater than the predetermined threshold value, in the automatically stopped state of the engine 10, the engine 10 is forcibly restated irrespective of the satisfaction or non-satisfaction of the restart condition. This makes it possible to more reliably prevent the automatically stopped engine 10 from falling into an unrestartable state. Further, the presence or absence of the post-attached load 601 is detected by diagnosing the current value and the change in voltage value of the starter battery 520. Thus, in cases where the current value and the voltage value are diagnosed using respective ones of the current sensor SN52 and the voltage sensor SN54, even if either one of the sensors fails, the presence or absence of the post-attached load 601 can be detected based on the other sensor. That is, a so-called fault tolerance function can also be obtained.

The internal combustion engine system according to each of the above embodiments further comprises running-state voltage-change diagnosis unit operable to compare a change in voltage value of the starter battery 520 with the predetermined threshold value, upon the satisfaction of the automatic stop condition, wherein the automatic-stop prohibition unit is operable, when a diagnosis result of the running-state voltage-change diagnosis unit indicates that the change in voltage value of the starter battery 520 is greater than the predetermined threshold value, to prohibit the operation of the automatic stop unit irrespective of the satisfaction or non-satisfaction of the automatic stop condition.

According to this feature, when the change in voltage value of the starter battery 520 is greater than the predetermined threshold value, upon the satisfaction of the automatic stop condition during running of the engine 10, the execution of the automatic stop control process for the engine 10 is prohibited irrespective of the satisfaction or non-satisfaction of the automatic stop condition. This makes it possible to more reliably prevent the automatically stopped engine from falling into an unrestartable state. In addition, a fault tolerance function based on the redundant control scheme can be obtained.

The internal combustion engine system according to each of the above embodiments further comprises automatic-stop prohibition unit operable to prohibit the operation of the automatic stop unit after satisfaction of a requirement for executing the forcible restart by the forcible restart unit.

According to this feature, when the value of current flowing out of the starter battery 520 becomes greater than the predetermined current value even once, or the change in voltage value of the starter battery 520 becomes greater than the predetermined threshold, i.e., a present running state involves a risk that an amount of electric power stored in the starter battery is reduced, the execution of the automatic stop control process is prohibited to provide a fail-safe function. This makes it possible to more securely prevent the engine 10 from falling into an unrestartable state.

The internal combustion engine system according to each of the above embodiments further comprises the electric load adapted to be activated in a stopped state of the engine 10, the general-purpose battery 510 for supplying electric power to the electric load, and stopped-state electric-power supply unit operable to allows electric power to be supplied from the general-purpose battery 510 to the electric load, in the stopped state of the engine 10, wherein the forcible restart unit is operable to allow electric power to be supplied from both the general-purpose battery 510 and the starter battery 520 to the starter unit 27.

According to this feature, in a running condition requires the forcible restart of the engine 10, electric power is supplied from not only the starter battery 520 but also the general-purpose battery 510. Thus, even if an amount of electric power stored in the starter battery 520 is reduced at a fast pace, electric power required for restarting the engine 10 can be ensured.

The present invention is not limited to the above embodiments, rather various changes and modifications may be made without departing from the spirit and scope of the present invention.

For example, as one control scheme for the engine 10, the non-assisted combustion-based restart control process may be omitted. Further, the detection of the post-attached load 601 based on the current/voltage of the starter battery 520 may be performed before execution of the combustion-based restart process.

Further, in the flowchart illustrated in FIG. 6, when the determination in Step S30 or Step S33 is NO, i.e., it is determined that the forcible restart is necessary, the control method may include the steps of: determining whether the combustion-based restart process is executable; and, if the combustion-based restart process is executable, executing the combustion-based restart process by priority, wherein, only if the starter-assisted start-up process is necessary, both the power relay 502 and the starter relay 503 are closed to drive the starter unit 27, in the same manner as that in Step S35.

In sum, one aspect of the present invention, there is provided a control method for an internal combustion engine system which includes an internal combustion engine, an electric drive unit adapted to start up the internal combustion engine, and a starter battery for use as an electric power source for activating the electric drive unit. The control method comprises: an automatic stop step of, upon satisfaction of a given automatic stop condition, automatically stopping the internal combustion engine being running; a restart step of, upon satisfaction of a given restart condition after the internal combustion engine is automatically stopped, supplying electric power from the starter battery to the electric drive unit to automatically restart the internal combustion engine; a post-attached load detection step of detecting the presence or absence of a post-attached load to be supplied with electric power from the starter battery, based on a discharging status of the starter battery in the automatically stopped state of the internal combustion engine; and a forcible restart step of, when the post-attached load is detected as a result of the post-attached load detection step, restarting the internal combustion engine irrespective of the satisfaction or non-satisfaction of the restart condition.

In cases where a user post-attaches an electric load, e.g., an accessory component, such as a lamp, in such a manner as to use electric power of the starter battery, an amount of electric power stored in the starter battery is likely to reduce in a stopped state of the internal combustion engine. In the control method of the present invention, the presence or absence of such a post-attached load to be supplied with electric power from the starter battery is detected based on a discharging status of the starter battery in the automatically stopped state of the internal combustion engine. Then, when the post-attached load is detected, the internal combustion engine is restarted irrespective of the satisfaction or non-satisfaction of the restart condition. This makes it possible to prevent the automatically stopped internal combustion engine from falling into an unrestartable state.

In a first preferred embodiment of the present invention, the control method comprises a stopped-state current-value diagnosis step of comparing a value of current flowing out of the starter battery with a predetermined current value, in the automatically stopped state of the internal combustion engine, wherein the stopped-state current-value diagnosis step is the post-attached load detection step.

According to this feature, a detection of whether or not the electric load is post-attached to the starter battery can be readily performed based on a diagnosis as to whether or not the value of current flowing out of the starter battery is greater than the predetermined current value in the automatically stopped state of the internal combustion engine.

More preferably, the control method according to the first preferred embodiment comprises a running-state current-value diagnosis step of comparing a value of current flowing out of the starter battery with the predetermined current value, upon the satisfaction of the automatic stop condition, and an automatic-stop prohibition step of, when a result of the running-state current-value diagnosis step indicates that the value of current flowing out of the starter battery is greater than the predetermined current value, prohibiting the automatic stop step irrespective of the satisfaction or non-satisfaction of the automatic stop condition.

According to this feature, when a current greater than the predetermined current value flows out of the starter battery, upon the satisfaction of the automatic stop condition during running of the internal combustion engine, i.e., the amount of electric power stored in the starter battery is likely to reduce in the stopped state of the internal combustion engine due to an electric load, e.g., an accessory component, such as a lamp, post-attached by a user, the execution of the automatic stop control process for the internal combustion engine is prohibited irrespective of the satisfaction or non-satisfaction of the automatic stop condition. This makes it possible to more reliably prevent the automatically stopped internal combustion engine from falling into an unrestartable state.

In a second preferred specific embodiment of the present invention, the control method comprises a stopped-state voltage-change diagnosis step of comparing a change in voltage value of the starter battery with a predetermined threshold value, in the automatically stopped state of the internal combustion engine, wherein the stopped-state voltage-change diagnosis step is the post-attached load detection step.

According to this feature, a detection of whether or not the electric load is post-attached to the starter battery can be readily performed based on a diagnosis as to whether or not the change in voltage value of the starter battery is greater than the predetermined threshold value, in the automatically stopped state of the internal combustion engine.

More preferably, the control method according to the first or second preferred embodiment comprises a running-state voltage-change diagnosis step of comparing a change in voltage value of the starter battery with a predetermined threshold value, upon the satisfaction of the automatic stop condition, and an automatic-stop prohibition step of, when a result of the running-state voltage-change diagnosis step indicates that the change in voltage value of the starter battery is greater than the predetermined threshold value, prohibiting the automatic stop step irrespective of the satisfaction or non-satisfaction of the automatic stop condition.

According to this feature, when the change in voltage value of the starter battery is greater than the predetermined threshold value, upon the satisfaction of the automatic stop condition during running of the internal combustion engine, i.e., the amount of electric power stored in the starter battery is likely to reduce in the stopped state of the internal combustion engine due to an electric load, e.g., an accessory component, such as a lamp, post-attached by a user, the execution of the automatic stop control process for the internal combustion engine is prohibited irrespective of the satisfaction or non-satisfaction of the automatic stop condition. This makes it possible to more reliably prevent the automatically stopped internal combustion engine from falling into an unrestartable state.

More preferably, the control method according to the first preferred embodiment further comprises a stopped-state voltage-change diagnosis step of comparing a change in voltage value of the starter battery with a predetermined threshold value, in the automatically stopped state of the internal combustion engine, wherein the forcible restart step includes, when a result of the stopped-state voltage-change diagnosis step indicates that the change in voltage value of the starter battery is greater than the predetermined threshold value, restarting the internal combustion engine irrespective of the satisfaction or non-satisfaction of the restart condition.

According to this feature, when the change in voltage value of the starter battery is greater than the predetermined threshold value, in the automatically stopped state of the internal combustion engine, the internal combustion engine is forcibly restated irrespective of the satisfaction or non-satisfaction of the restart condition. This makes it possible to more reliably prevent the automatically stopped internal combustion engine from failing into an unrestartable state. Further, the presence or absence of the post-attached load is detected based on the discharging status of the starter battery obtained by diagnosing the current value and the change in voltage value of the starter battery. Thus, in cases where the current value and the voltage value are diagnosed using respective ones of a current sensor and a voltage sensor, even if either one of the sensors fails, the presence or absence of the post-attached load can be detected based on the other sensor. That is, a so-called fault tolerance function can also be obtained.

In a third preferred embodiment of the present invention, the internal combustion system includes an electric load adapted to be activated in a stopped state of the internal combustion engine, and a general-purpose battery for supplying electric power to the electric load, wherein the control method further comprises a stopped-state electric-power supply step of supplying electric power from the general-purpose battery to the electric load, in the stopped state of the internal combustion engine, and wherein the forcible restart step includes supplying electric power from both the general-purpose battery and the starter battery to the electric drive unit.

According to this feature, in a running condition requires the forcible restart of the internal combustion engine, electric power is supplied from not only the starter battery but also the general-purpose battery. Thus, even if an amount of electric power stored in the starter battery is reduced at a fast pace, electric power required for restarting the internal combustion engine can be ensured.

According to another aspect of the present invention, there is provided an internal combustion engine system which comprises an internal combustion engine, an electric drive unit adapted to start up the internal combustion engine, a starter battery for use as an electric power source for activating the electric drive unit, and running control unit configured to govern a running control of the internal combustion engine. In the internal combustion engine system, the running control unit includes: automatic stop unit operable, upon satisfaction of a given automatic stop condition, to automatically stop the internal combustion engine being running; restart unit operable, upon satisfaction of a given restart condition after the internal combustion engine is automatically stopped, to allow electric power to be supplied from the starter battery to the electric drive unit so as to automatically restart the internal combustion engine; post-attached load detection unit operable to detect the presence or absence of a post-attached load to be supplied with electric power from the starter battery, based on a discharging status of the starter battery in an automatically stopped state of the internal combustion engine; and forcible restart unit operable, when the post-attached load is detected as a detection result of the post-attached load detection unit, to restart the internal combustion engine irrespective of the satisfaction or non-satisfaction of the restart condition.

In cases where a user post-attaches an electric load, e.g., an accessory component, such as a lamp, in such a manner as to use electric power of the starter battery, an amount of electric power stored in the starter battery is likely to reduce in a stopped state of the internal combustion engine. In the control method of the present invention, the presence or absence of such a post-attached load to be supplied with electric power from the starter battery is detected based on a discharging status of the starter battery in the automatically stopped state of the internal combustion engine. Then, when the post-attached load is detected, the internal combustion engine is restarted irrespective of the satisfaction or non-satisfaction of the restart condition. This makes it possible to prevent the automatically stopped internal combustion engine from falling into an unrestartable state.

In a first preferred embodiment of the present invention, the internal combustion engine system comprises stopped-state current-value diagnosis unit operable to compare a value of current flowing out of the starter battery with a predetermined current value, in the automatically stopped state of the internal combustion engine, wherein the stopped-state current-value diagnosis unit serves as the post-attached load detection unit.

According to this feature, the stopped-state current-value diagnosis unit is operable to compare the value of current flowing out of the starter battery with the predetermined current value. This makes it possible to facilitate the detection of the post-attached load.

More preferably, the internal combustion engine system according to the first preferred embodiment comprises running-state current-value diagnosis unit operable to compare a value of current flowing out of the starter battery with the predetermined current value, upon the satisfaction of the automatic stop condition, and automatic-stop prohibition unit operable, when a diagnosis result of the running-state current-value diagnosis unit indicates that the value of current flowing out of the starter battery is greater than the predetermined current value, to prohibit the operation of the automatic stop unit irrespective of the satisfaction or non-satisfaction of the automatic stop condition.

According to this feature, when a current greater than the predetermined current value flows out of the starter battery, upon the satisfaction of the automatic stop condition during running of the internal combustion engine, i.e., the amount of electric power stored in the starter battery is likely to reduce in the stopped state of the internal combustion engine due to an electric load. e.g., an accessory component, such as a lamp, post-attached by a user, the execution of the automatic stop control process for the internal combustion engine is prohibited irrespective of the satisfaction or non-satisfaction of the automatic stop condition. This makes it possible to more reliably prevent the automatically stopped internal combustion engine from falling into an unrestartable state.

In a second preferred specific embodiment of the present invention, the internal combustion engine system comprises stopped-state voltage-change diagnosis unit operable to compare a change in voltage value of the starter battery with a predetermined threshold value, in the automatically stopped state of the internal combustion engine, wherein the stopped-state voltage-change diagnosis unit serves as the post-attached load detection unit.

According to this feature, a detection of whether or not the electric load is post-attached to the starter battery can be readily performed based on a diagnosis as to whether or not the change in voltage value of the starter battery is greater than the predetermined threshold value, in the automatically stopped state of the internal combustion engine.

More preferably, the internal combustion engine system according to the first or second preferred embodiment comprises running-state voltage-change diagnosis unit operable to compare a change in voltage value of the starter battery with a predetermined threshold value, upon the satisfaction of the automatic stop condition, and automatic-stop prohibition unit operable, when a diagnosis result of the running-state voltage-change diagnosis unit indicates that the change in voltage value of the starter battery is greater than the predetermined threshold value, to prohibit the operation of the automatic stop unit irrespective of the satisfaction or non-satisfaction of the automatic stop condition.

According to this feature, when the change in voltage value of the starter battery is greater than the predetermined threshold value, upon the satisfaction of the automatic stop condition during running of the internal combustion engine, i.e., the amount of electric power stored in the starter battery is likely to reduce in the stopped state of the internal combustion engine due to an electric load, e.g., an accessory component, such as a lamp, post-attached by a user, the execution of the automatic stop control process for the internal combustion engine is prohibited irrespective of the satisfaction or non-satisfaction of the automatic stop condition. This makes it possible to more reliably prevent the automatically stopped internal combustion engine from falling into an unrestartable state.

More preferably, the internal combustion engine system according to the first preferred embodiment further comprises stopped-state voltage-change diagnosis unit operable to compare a change in voltage value of the starter battery with a predetermined threshold value, in the automatically stopped state of the internal combustion engine, wherein the forcible restart unit is operable, when a diagnosis result of the stopped-state voltage-change diagnosis unit indicates that the change in voltage value of the starter battery is greater than the predetermined threshold value, to restart the internal combustion engine irrespective of the satisfaction or non-satisfaction of the restart condition.

According to this feature, when the change in voltage value of the starter battery is greater than the predetermined threshold value, in the automatically stopped state of the internal combustion engine, the internal combustion engine is forcibly restated irrespective of the satisfaction or non-satisfaction of the restart condition. This makes it possible to more reliably prevent the automatically stopped internal combustion engine from falling into an unrestartable state. Further, the presence or absence of the post-attached load is detected based on the discharging status of the starter battery obtained by diagnosing the current value and the change in voltage value of the starter battery. Thus, in cases where the current value and the voltage value are diagnosed using respective ones of a current sensor and a voltage sensor, even if either one of the sensors fails, the presence or absence of the post-attached load can be detected based on the other sensor. That is, a so-called fault tolerance function can also be obtained.

In a third preferred embodiment of the present invention, the internal combustion engine system further comprises an electric load adapted to be activated in a stopped state of the internal combustion engine, a general-purpose battery for supplying electric power to the electric load, and stopped-state electric-power supply unit operable to allows electric power to be supplied from the general-purpose battery to the electric load, in the stopped state of the internal combustion engine, wherein the forcible restart unit is operable to allow electric power to be supplied from both the general-purpose battery and the starter battery to the electric drive unit.

According to this feature, in a running condition requires the forcible restart of the internal combustion engine, electric power is supplied from not only the starter battery but also the general-purpose battery. Thus, even if an amount of electric power stored in the starter battery is reduced at a fast pace, electric power required for restarting the internal combustion engine can be ensured.

As mentioned above, the present invention provides a significant advantage of being able to prevent an internal combustion engine in a state after being automatically stopped, from falling into an unrestartable state.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

This application is based on Japanese Patent Application Serial No. 2008-088049 and Serial No. 2008-088050 filed in Japan Patent Office both on Mar. 28, 2008, the contents of which are hereby incorporated by reference.

What is claimed is:

1. A control method for an internal combustion engine system for a vehicle, which includes an internal combustion engine, an electric drive unit adapted to start up the internal combustion engine, a starter battery for use as an electric power source for activating the electric drive unit, an electric load that is activated in a stopped-state of the internal combustion engine, and a general-purpose battery for supplying electric power to the electric load, the control method comprising:
    automatically stopping the internal combustion engine being running upon satisfaction of a given automatic stop condition;
    supplying electric power from the starter battery to the electric drive unit to automatically restart the internal combustion engine upon satisfaction of a given restart condition after the internal combustion engine is automatically stopped;
    detecting the presence or absence of a post-attached load to be supplied with electric power from the starter battery in a post-attached load detection, wherein the post-attached load is provided in addition to electric loads in conformity with specifications of the vehicle and connected to the starter battery, based on a discharging status of the starter battery due to the post-attached load in the automatically stopped state of the internal combustion engine; and
    restarting the internal combustion engine irrespective of the satisfaction or non-satisfaction of the restart condition when the post-attached load is detected as a result of the post-attached load detection.

2. The control method as defined in claim 1, further-comprising:
    performing a stopped-state current-value diagnosis, including comparing a value of current flowing out of the starter battery with a predetermined current value during the automatically stopped state of the internal combustion engine, wherein the stopped-state current-value diagnosis corresponds to said post-attached load detection.

3. The control method as defined in claim 2, further comprising:
    performing a running-state current-value diagnosis, including comparing a value of current flowing out of the starter battery with the predetermined current value, upon the satisfaction of the automatic stop condition; and
    performing an automatic-stop prohibition, when a result of the running-state current-value diagnosis indicates that the value of current flowing out of the starter battery is greater than the predetermined current value, prohibiting the automatic stop irrespective of the satisfaction or non-satisfaction of the automatic stop condition.

4. The control method as defined in claim 1, further comprising performing a stopped-state voltage-change diagnosis, including comparing a change in voltage value of the starter battery with a predetermined threshold value, in the automatically stopped state of the internal combustion engine, wherein the stopped-state voltage-change diagnosis corresponds to said post-attached load detection.

5. The control method as defined in claim 2, further comprising:
    performing a running-state voltage-change diagnosis, including comparing a change in voltage value of the starter battery with a predetermined threshold value, upon the satisfaction of the automatic stop condition; and
    performing an automatic-stop prohibition, when a result of the running-state voltage-change diagnosis step indicates that the change in voltage value of the starter battery is greater than the predetermined threshold value, prohibiting the automatic stop irrespective of the satisfaction or non-satisfaction of the automatic stop condition.

6. The control method as defined in claim 4, further comprising:
    performing a running-state voltage-change diagnosis, including comparing a change in voltage value of the starter battery with the predetermined threshold value, upon the satisfaction of the automatic stop condition; and
    performing an automatic-stop prohibition, when a result of the running-state voltage-change diagnosis indicates that the change in voltage value of the starter battery is greater than the predetermined threshold value, prohibiting the automatic stop irrespective of the satisfaction or non-satisfaction of the automatic stop condition.

7. The control method as defined in claim 2, further comprising:
    performing a stopped-state voltage-change diagnosis, including comparing a change in voltage value of the starter battery with a predetermined threshold value, in the automatically stopped state of the internal combustion engine, wherein the forcible restart includes, when a result of the stopped-state voltage-change diagnosis indicates that the change in voltage value of the starter battery is greater than the predetermined threshold value, restarting the internal combustion engine irrespective of the satisfaction or non-satisfaction of the restart condition.

8. The control method as defined in claim 1,
    wherein the forcible restart includes supplying electric power from both the general-purpose battery and the starter battery to the electric drive unit.

9. The control method as defined in claim 2, wherein the forcible restart includes supplying electric power from both the general-purpose battery and the starter battery to the electric drive unit.

10. The control method as defined in claim 4, wherein the forcible restart step includes supplying electric power from both the general-purpose battery and the starter battery to the electric drive unit.

11. An internal combustion engine system for a vehicle, including an internal combustion engine, an electric drive unit adapted to start up the internal combustion engine, a starter battery for use as an electric power source for activating the electric drive unit, an electric load that is activated in a stopped-state of the internal combustion engine, a general-purpose battery for supplying electric power to the electric load and running control unit configured to govern a running control of the internal combustion engine, the running control unit comprising:
    an automatic stop unit operable, upon satisfaction of a given automatic stop condition, to automatically stop the internal combustion engine being running;
    a restart unit operable, upon satisfaction of a given restart condition after the internal combustion engine is automatically stopped, to allow electric power to be supplied from the starter battery to the electric drive unit so as to automatically restart the internal combustion engine;

a post-attached load detection unit operable to detect the presence or absence of a post-attached load to be supplied with electric power from the starter battery wherein the post-attached load is provided in addition to electric loads in conformity with specifications of the vehicle and connected to the starter battery, based on a discharging status of the starter battery due to the post-attached load in the automatically stopped state of the internal combustion engine; and a forcible restart unit operable, when the post-attached load is detected as a detection result of the post-attached load detection unit, to restart the internal combustion engine irrespective of the satisfaction or non-satisfaction of the restart condition.

12. The internal combustion engine system as defined in claim 11, further comprising:

a stopped-state current-value diagnosis unit operable to compare a value of current flowing out of the starter battery with a predetermined current value, in the automatically stopped state of the internal combustion engine, wherein the stopped-state current-value diagnosis unit serves as the post-attached load detection unit.

13. The internal combustion engine system as defined in claim 12, further comprising:

a running-state current-value diagnosis unit operable to compare a value of current flowing out of the starter battery with the predetermined current value, upon the satisfaction of the automatic stop condition; and an automatic-stop prohibition unit operable, when a diagnosis result of the running-state current-value diagnosis unit indicates that the value of current flowing out of the starter battery is greater than the predetermined current value, to prohibit the operation of the automatic stop unit irrespective of the satisfaction or non-satisfaction of the automatic stop condition.

14. The internal combustion engine system as defined in claim 11, further comprising:

a stopped-state voltage-change diagnosis unit operable to compare a change in voltage value of the starter battery with a predetermined threshold value, in the automatically stopped state of the internal combustion engine, wherein the stopped-state voltage-change diagnosis unit serves as the post-attached load detection unit.

15. The internal combustion engine system as defined in claim 12, further comprising:

a running-state voltage-change diagnosis unit operable to compare a change in voltage value of the starter battery with a predetermined threshold value, upon the satisfaction of the automatic stop condition; and an automatic-stop prohibition unit operable, when a diagnosis result of the running-state voltage-change diagnosis unit indicates that the change in voltage value of the starter battery is greater than the predetermined threshold value, to prohibit the operation of the automatic stop unit irrespective of the satisfaction or non-satisfaction of the automatic stop condition.

16. The internal combustion engine system as defined in claim 14, further comprising:

a running-state voltage-change diagnosis unit operable to compare a change in voltage value of the starter battery with the predetermined threshold value, upon the satisfaction of the automatic stop condition; and an automatic-stop prohibition unit operable, when a diagnosis result of the running-state voltage-change diagnosis unit indicates that the change in voltage value of the starter battery is greater than the predetermined threshold value, to prohibit the operation of the automatic stop unit irrespective of the satisfaction or non-satisfaction of the automatic stop condition.

17. The internal combustion engine system as defined in claim 12, further comprising:

a stopped-state voltage-change diagnosis unit operable to compare a change in voltage value of the starter battery with a predetermined threshold value, in the automatically stopped state of the internal combustion engine, wherein the forcible restart unit is operable, when a diagnosis result of the stopped-state voltage-change diagnosis unit indicates that the change in voltage value of the starter battery is greater than the predetermined threshold value, to restart the internal combustion engine irrespective of the satisfaction or non-satisfaction of the restart condition.

18. The internal combustion engine system as defined in claim 11, wherein the forcible restart unit is operable to allow electric power to be supplied from both the general-purpose battery and the starter battery to the electric drive unit.

19. The internal combustion engine system as defined in claim 12, wherein the forcible restart unit is operable to allow electric power to be supplied from both the general-purpose battery and the starter battery to the electric drive unit.

20. The internal combustion engine system as defined in claim 14, wherein the forcible restart unit is operable to allow electric power to be supplied from both the general-purpose battery and the starter battery to the electric drive unit.

* * * * *